United States Patent
Fong et al.

(10) Patent No.: US 9,642,114 B2
(45) Date of Patent: May 2, 2017

(54) PATH-LOSS ESTIMATION FOR UPLINK POWER CONTROL IN A CARRIER AGGREGATION ENVIRONMENT

(75) Inventors: Mo-Han Fong, Sunnyvale, CA (US); Hong He, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 1138 days.

(21) Appl. No.: 13/537,967

(22) Filed: Jun. 29, 2012

(65) Prior Publication Data

US 2013/0142113 A1 Jun. 6, 2013

Related U.S. Application Data

(60) Provisional application No. 61/556,109, filed on Nov. 4, 2011.

(51) Int. Cl.
*H04W 52/14* (2009.01)
*H04W 52/24* (2009.01)
(Continued)

(52) U.S. Cl.
CPC ............ *H04W 68/02* (2013.01); *H04B 7/024* (2013.01); *H04B 7/0456* (2013.01); *H04J 3/12* (2013.01);
(Continued)

(58) Field of Classification Search
None
See application file for complete search history.

(56) References Cited

U.S. PATENT DOCUMENTS

2010/0085916 A1\* 4/2010 Yu ........................... H04L 45/00
370/328
2010/0296389 A1 11/2010 Khandekar et al.
(Continued)

FOREIGN PATENT DOCUMENTS

KR 10-2009-0129469 A 12/2009
KR 10-2010-0118140 A 11/2010
(Continued)

OTHER PUBLICATIONS

3GPP TSG RAN WG1 #58bis R1-093906, "Uplink Power Control for LTE-Advanced", Oct. 2009, pp. 6, Agenda 7.2.5, Nokia Siemens Network, Miyazaki, Japan.
(Continued)

*Primary Examiner* — Ayaz Sheikh
*Assistant Examiner* — Mariela Vidal Carpio
(74) *Attorney, Agent, or Firm* — Thorpe North & Western, LLP

(57) ABSTRACT

Technology for uplink power control in a wireless network is disclosed. Receiving a component carrier list at a User Equipment (UE) is disclosed where the component carriers grouped in the list have one or more common characteristics relative to the power necessary for uplink transmission on those component carriers. A path-loss estimation performed on the downlink of a component carrier in the component carrier list can, therefore, be used to control uplink transmission for other component carriers in the list. Additionally, a UE can receive a path-loss difference parameter providing an offset for one or more factors related to the power necessary for uplink transmission between a component carrier with certain characteristics relative to those factors and a component carrier with different characteristics relative to those same factors.

25 Claims, 13 Drawing Sheets

(51) Int. Cl.

| | | |
|---|---|---|
| *H04W 72/08* | (2009.01) | |
| *H04B 7/02* | (2006.01) | |
| *H04W 68/02* | (2009.01) | |
| *H04W 72/04* | (2009.01) | |
| *H04B 7/024* | (2017.01) | |
| *H04B 7/0456* | (2017.01) | |
| *H04W 4/06* | (2009.01) | |
| *H04W 24/02* | (2009.01) | |
| *H04W 4/00* | (2009.01) | |
| *H04J 3/12* | (2006.01) | |
| *H04L 5/00* | (2006.01) | |
| *H04L 5/14* | (2006.01) | |
| *H04L 1/00* | (2006.01) | |
| *H04L 27/26* | (2006.01) | |
| *H04W 76/00* | (2009.01) | |
| *H04W 76/02* | (2009.01) | |
| *H04W 52/34* | (2009.01) | |
| *H04W 84/14* | (2009.01) | |

(52) U.S. Cl.
CPC .......... *H04L 1/0026* (2013.01); *H04L 1/0077* (2013.01); *H04L 5/0055* (2013.01); *H04L 5/0078* (2013.01); *H04L 5/14* (2013.01); *H04L 27/2662* (2013.01); *H04W 4/005* (2013.01); *H04W 4/06* (2013.01); *H04W 24/02* (2013.01); *H04W 52/146* (2013.01); *H04W 52/242* (2013.01); *H04W 72/042* (2013.01); *H04W 72/085* (2013.01); *H04W 76/002* (2013.01); *H04W 76/021* (2013.01); *H04W 52/244* (2013.01); *H04W 52/34* (2013.01); *H04W 84/14* (2013.01); *Y02B 60/50* (2013.01)

(56) References Cited

U.S. PATENT DOCUMENTS

| | | | | |
|---|---|---|---|---|
| 2010/0297993 | A1* | 11/2010 | Heo | H04W 52/365 455/423 |
| 2011/0038271 | A1* | 2/2011 | Shin | H04W 52/146 370/252 |
| 2011/0081927 | A1 | 4/2011 | Gerstenberger et al. | |
| 2011/0096815 | A1* | 4/2011 | Shin | H04B 7/0689 375/219 |
| 2011/0136351 | A1 | 6/2011 | Rohrbach et al. | |
| 2011/0267978 | A1* | 11/2011 | Etemad | H04L 5/003 370/254 |
| 2011/0312328 | A1* | 12/2011 | Choi | H04L 5/0062 455/450 |
| 2012/0057499 | A1* | 3/2012 | Pedersen | H04L 1/0029 370/252 |
| 2012/0094608 | A1* | 4/2012 | Shi | H04W 24/10 455/67.11 |
| 2012/0178494 | A1* | 7/2012 | Haim | H04W 52/365 455/522 |
| 2012/0263060 | A1* | 10/2012 | Suzuki | H04W 52/365 370/252 |
| 2012/0289286 | A1* | 11/2012 | Miki | H04W 48/12 455/552.1 |
| 2012/0307821 | A1* | 12/2012 | Kwon | H04L 5/001 370/350 |
| 2013/0051214 | A1* | 2/2013 | Fong | H04W 24/10 370/252 |
| 2013/0114505 | A1* | 5/2013 | Haim | H04W 52/146 370/328 |

FOREIGN PATENT DOCUMENTS

| | | | | |
|---|---|---|---|---|
| WO | WO2010/148961 | * | 12/2010 | ............ H04W 24/00 |
| WO | 2013/067030 A1 | | 5/2013 | |

OTHER PUBLICATIONS

3GPP TSG RAN WG1 #59bis R1-100414, "PUSCH and PUCCH Power Scaling for Carrier Aggregation", Jan. 2010, pp. 4, Agenda 7.1.7, Alcatel-Lucent Shanghai Bell, Valencia, Spain.

3GPP TSG RAN WG1 #60bis R1-101893, "Autonomous Base Component Carrier Selection Results in Dense Urban Area Scenario", Apr. 2010, pp. 14, Agenda 6.2.7, Nokia Siemens Networks, Beijing, China.

3GPP TSG-RAN WG2 #70bis R2-103580, "Summary of e-mail discussion [70#15] LTE CA: PHR Handling", Jul. 2010, pp. 19, Agenda 7.1.1.6, Ericsson, Stockholm, Sweden.

International Search Report and Written Opinion received for PCT Patent Application No. PCT/US2012/062827, mailed on Feb. 26, 2013, 10 pages.

* cited by examiner

PATH-LOSS ESTIMATION FOR UPLINK POWER CONTROL IN A CARRIER AGGREGATION ENVIRONMENT

RELATED APPLICATIONS

This application claims the benefit of and hereby incorporates by reference U.S. Provisional Patent Application Ser. No. 61/556,109, filed Nov. 4, 2011.

BACKGROUND

Wireless communication devices need to control the power at which uplink transmissions take place to reduce the potential for interference and to save battery power. Often the power necessary for uplink transmission depends on propagation distances. In addition to propagation distances, the frequency of transmission, channel interference, and the propagation environment make important contributions to the power necessary for successful and reliable uplink transmission.

Various wireless standards, including The Third Generation Partnership Project (3GPP) Long Term Evolution (LTE) specifications, employ both closed loop and open loop mechanisms to address power control. In a closed loop mechanism, an evolved Node B (eNodeB) directly controls uplink transmission power by communicating explicit power control commands to a wireless communication device/user equipment (UE). In open loop mechanisms, a determination of uplink transmission power relies, at least in part, on estimates derived from measurements of downlink transmission path-loss.

Open and closed loop mechanisms for power control are being employed in environments of ever increasing numbers of UEs with ever increasing abilities. These abilities, such as the ability to display audiovisual presentations and to transmit and receive pictures, information related to games, television, movies, and so forth, increase the need both for greater bandwidth, in terms of greater frequency ranges within which wireless communication can take place, and for more efficient use of that bandwidth.

To accommodate these needs, wireless communication standards are coming to rely on technologies such as carrier aggregation, to increase bandwidth, and technologies related to multiple input, multiple output (MIMO) and heterogeneous networks to improve the efficiency with which that bandwidth is used. These technologies, however, complicate approaches to power control that rely on timing advances and open loop mechanisms.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

DEFINITIONS

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness can in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter. The following definitions are provided for clarity of the overview and embodiments described below.

Figure 1A:
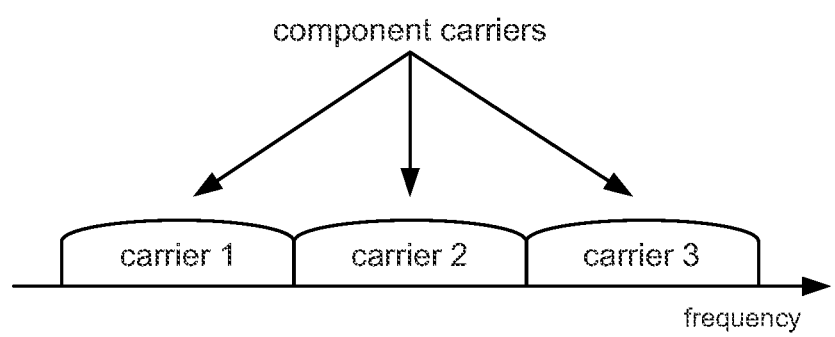
FIG. 1a is a block diagram illustrating multiple contiguous component carriers in accordance with an example.

FIG. 1a illustrates an example of carrier aggregation of continuous carriers. Carrier aggregation is an important technology for increasing bandwidth to increase the amount of data that can be communicated across wireless networks and has important implications for power control. In the example, three carriers are contiguously located along a frequency band. Each carrier is used to communicate data over the air. Each carrier can be referred to as a component carrier. In a continuous type of system, the component carriers are located adjacent to one another and are typically located within a single frequency band. A frequency band is comprised of a range of frequencies in the electromagnetic spectrum with similar propagation properties, such as path-loss and multipath characteristics.

Selected frequency bands are designated for use with wireless communications such as wireless telephony and wireless data transmission. Certain portions of frequency bands can be owned or leased by a wireless service provider. Each adjacent component carrier can have the same frequency band, or different frequency bands. A frequency band is a selected portion of the radio frequency band over which radio communication can take place. Wireless telephony has traditionally been conducted within a single frequency band. Component carriers that are located in the same frequency band (i.e. substantially adjacent) can have similar path-loss and other propagation properties.

By aggregating component carriers, the bandwidth of each component carrier can be combined to increase the overall total available bandwidth. As total available bandwidth increases, larger data loads can be accommodated, speeds maintained or increased, and quality of service maintained or improved. However, it is often not possible to find adjacent swaths of bandwidth available for dedication as additional component carriers from continuous portions of the radio frequency spectrum.

Existing spectrum allocation policies and the relatively narrow frequency bands that are currently available for wireless telephony make it difficult to allocate continuous portions of the radio frequency spectrum to achieve large bandwidths. This is particularly true as more and more component carriers are required to meet increasing demands placed on wireless communication systems. Therefore, carrier components must be aggregated from non-continuous portions of the frequency spectrum.

Figure 1B:
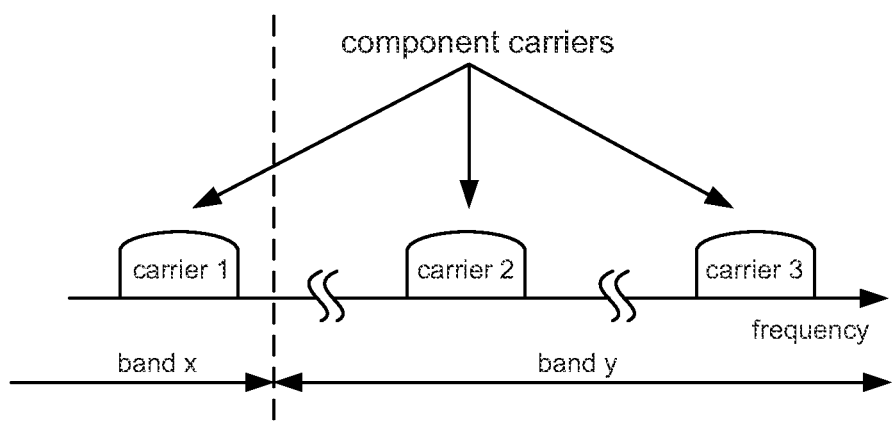
FIG. 1b is a block diagram illustrating multiple non-contiguous component carriers and the potential for component carries to reside in different frequency bands in accordance with an example.

FIG. 1b illustrates an example of carrier aggregation of non-contiguous component carriers. The non-contiguous component carriers can be separated along the frequency range. Component carrier can even be located in different frequency bands. For example, and without limitation, carrier 1 can be in band x while carrier 2 and carrier 3 can be in band y, as depicted in FIG. 1b. Since these carriers are in different bands, the propagation characteristics of these carriers can vary widely, resulting in different multi-path characteristics and significantly different path-loss values.

For example, the free space path-loss difference values between two component carriers can vary by 1 dB to 14 dB or greater at a receiver. The differences can also be greatly exacerbated by propagation environment. The path-loss difference values of the previous example can rise to 25 dB or greater in suburban and urban environments. Therefore, path-loss is clearly a function of both frequency band and propagation environment. Multipath characteristics will also vary widely between component carriers in different frequency bands, and the differences in those characterization properties will also be influenced by the propagation environment. Furthermore, the path-loss and other propagation characteristics of component carriers within the same band such as carrier 2 and carrier 3 can also vary in significant ways depending on the size of the range of frequencies between these two component carriers.

In a wireless communication environment, a wireless device, such as a user equipment (UE), can be configured to communicate with a base station. The base station can be, but need not necessarily be, an evolved Node B (eNodeB or eNB) or base station. The UE can initiate communication with the base station, or eNodeB, via a selected component carrier, such as those depicted in FIG. 1a and FIG. 1b.

The selected component carrier for communication with the eNodeB can be designated as a first component carrier. Each component carrier at the UE can appear as a serving cell at the UE, as defined by 3GPP LTE Release 9 specification, released in the fourth quarter of 2009. The serving cell associated with the component carrier that is configured with the full control channels/signals by the eNodeB to the UE can also be referred to as a Primary Serving Cell (PCell).

While the terminology of the 3GPP LTE standard is used throughout this specification, it is not intended to be limiting. A UE configured to communicate with an eNodeB is considered to be synonymous with a generic radio frequency mobile communication device configured to communicate with a base station, unless otherwise noted. Similar comments can be made with respect to PCells and other terms used herein.

The PCell typically involves the first component carrier set up for a UE. However, any component carrier can be designated as the PCell. If additional component carriers are needed at the UE to provide a desired bandwidth, quality of service, or other desired features, additional component carriers can be assigned to the UE by the eNodeB via the radio resource control (RRC) signaling. Each additional component carrier can be configured and associated with a Secondary Serving Cell (SCell) at the UE. In one embodiment, the secondary serving cell can have no physical uplink control channel (PUCCH) transmission to the UE based on the current LTE Rel-8/9/10 specifications.

The additional component carriers can be from contiguous portions of the electromagnetic spectrum relative to the first selected component carrier of the PCell. They can also, however, come from non-contiguous portions of the electromagnetic spectrum relative to the first selected component carrier and/or one another. Furthermore, component carriers used in PCell and Scell formation can pertain to different frequency bands (reference hereinafter will only be made to cells with the understanding that a cell can comprise a component carrier configured only for uplink or downlink transmission).

The potential for uplink transmission in different frequency bands on different component carriers occasioned by carrier aggregation technologies complicates open loop power control mechanisms. An estimation of path-loss for a downlink transmission on a first component carrier can be helpful to determine the power for uplink transmission on that component carrier, but can be very inaccurate and insufficient for controlling power for uplink transmission on other component carriers. Carrier aggregation, however, is not the only technology employed to increase bandwidth that can complicate UE uplink transmission control.

In addition to complications for power control imposed by carrier aggregation technologies, heterogeneous networks increase the need for power control to avoid interference among the many cells possible in a heterogeneous network and create complications in terms of different propagation distances. When a UE is turned on, or activated, the distance between the UE and an eNodeB results in a propagation delay in the signal. The propagation delay can cause problems in many different wireless network standards.

For example, 3GPP LTE uses Single Carrier Orthogonal Frequency Division Multiplexing (SC-OFDM) as a modulation standard for uplink transmission. In SC-OFDM, at any one time, uplink transmission for a particular UE occurs on a single carrier. The uplink transmissions from several UEs, however, can be multiplexed on the multiple sub-carriers available for transmission in OFDM. The multiplexing of uplink transmissions from multiple UEs makes the coordination of transmissions from the UEs necessary. Coordination of the UEs makes an issue of the timing delays associated with those UEs.

Figure 2:
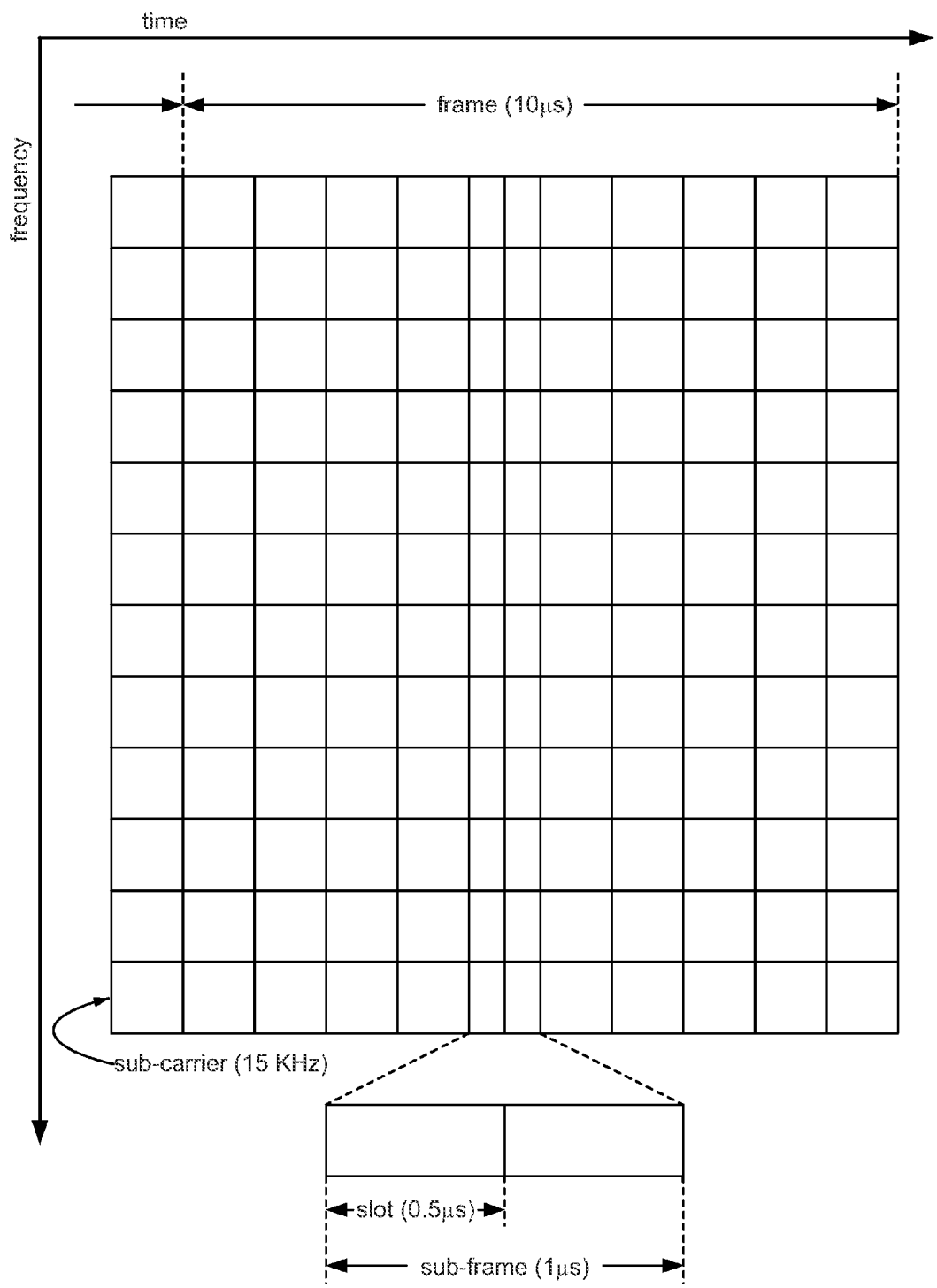
FIG. 2 provides a schematic description of transmission resources made available in a OFDM framework.

FIG. 2 provides a schematic description of transmission resources made available in the OFDM framework. OFDM provides resources for radio transmission defined by both time and frequency. In terms of frequency, current LTE Rel-8/9/10 specifications recite that each component carrier is broken up into multiple sub-carriers, with each sub-carrier having a bandwidth of 15 KHz. Depending on the size of the component carrier, the number of sub-carriers can vary from 72 to 1200 sub-carriers. In terms of time, transmission is divided into multiple frames. Each frame has a width of 10 micro seconds. Each frame is divided into ten sub-frames of 1 microsecond each; and each sub-frame is further divided into two 0.5 micro-second slots.

In SC-OFDM uplink transmission, the scheduler of the eNodeB assigns different UEs different sub-carriers and slots. However, if the various propagation delays for the various UEs are not accounted for, transmission will occur for multiple users in the same resource elements, resulting in interference and confusion. Therefore, each UE must account for its propagation delay during uplink transmission to assure that it is transmitting within the proper resource elements.

To account for the propagation delay, the transmit timing at the UE can be adjusted. This is typically accomplished by transmitting a signal from the UE to the eNodeB and receiving a response from the eNodeB that instructs the UE how much the transmit timing at the UE needs to be adjusted (forwards or backwards) based on how closely the signal from the UE correlates with a timing advance signal at the eNodeB.

The 3GPP LTE specification Releases 8, 9, and 10 designate that the signal transmitted from the UE includes a random access preamble. The random access preamble can be assigned at the Medium Access Control (MAC) layer in the uplink and communicated on a Random Access Channel (RACH) such as the Physical Random Access Channel (PRACH). This signal transmitted by the UE is received at the eNodeB and correlated with a timing reference signal. A determination is made by the eNodeB, based on the correlation, of how much the timing advance of the transmission of the carrier signal at the UE will need to be adjusted. The timing advance can be adjusted in a positive or negative direction.

The eNodeB can then send a Random Access Response (RAR) that provides a timing advance command element. Upon receiving the RAR, the UE can then adjust the timing of its transmissions based on the number received. The UE timing can be adjusted with a relative accuracy better than or equal to $+/-4Ts$, where $Ts=1/(15,000*2048)$ seconds. The change in transmission timing at the UE is referred to as a timing advance (whether the timing is moved backwards or forwards in time). After the initial synchronization from the RACH, the eNodeB can use other uplink signals such as the cyclic prefix or the uplink reference signal for synchronization tracking and/or updating.

Currently, in the 3GPP LTE Release 10 specification, only one timing advance value is supported with the following two restrictions for the UE configured with carrier aggregations: (1) the timing advance is based on synchronization to the PCell; and (2) no RACH procedure is allowed for a SCell. The use of multiple carrier components, however, can add additional complications in setting up a downlink and uplink connection with an eNodeB. Both the uplink PCell and SCell(s) share the same single timing advance, which is maintained on the PCell. Therefore, only a single timing advancement in the uplink is supported, even when multiple component carriers in the same band or different frequency bands are aggregated.

Figure 3:
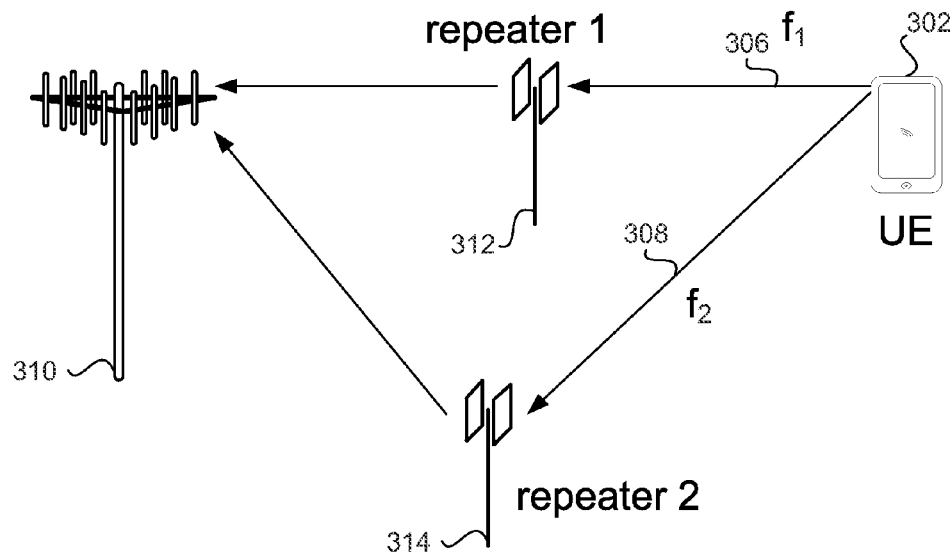
FIG. 3 is a block diagram illustrating a communication system using frequency selective repeaters in accordance with an example.
Figure 4:
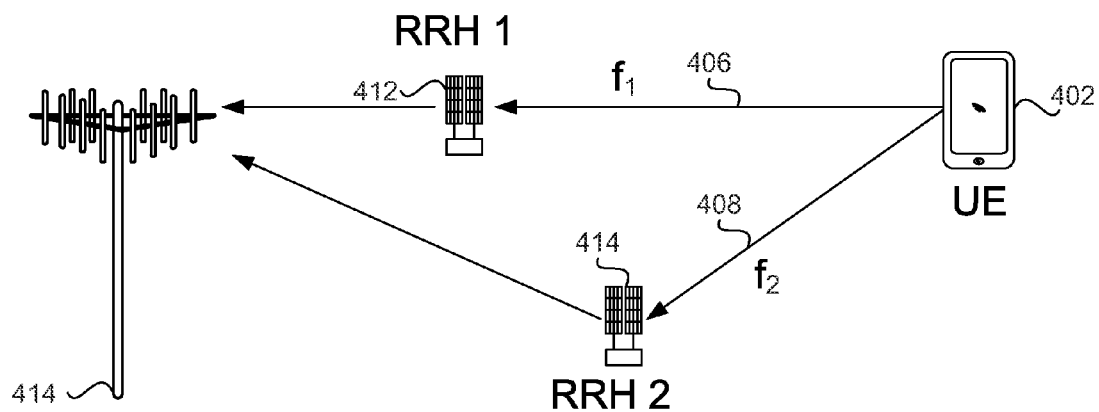
FIG. 4 is a block diagram illustrating a communication system using frequency selective remote radio heads in accordance with an example.
Figure 5:
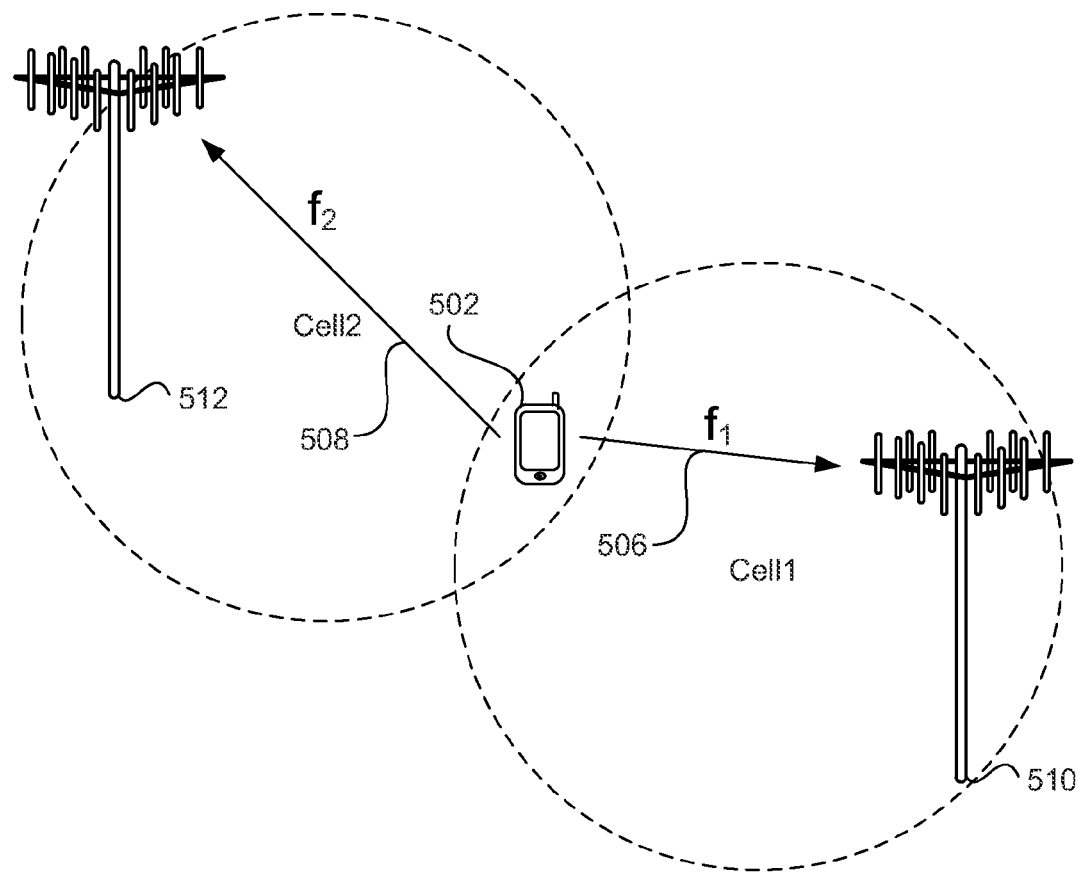
FIG. 5 is a block diagram illustrating a communication system using multiple Coordinated MultiPoint (COMP) base stations in accordance with an example.

As networks become more heterogeneous, employing more elements to handle increasing demands, however, there are several scenarios where separate timing advances per component carrier are necessary to account for different path lengths that correspond to different propagation distances and power demands for transmission. To accommodate the use of multiple communication nodes, such as eNodeBs, in a heterogeneous network, the system can be configured to allow for multiple timing advances. These multiple timing advances can be used beneficially for power control in heterogeneous networks employing carrier aggregation. In such networks propagation distances for uplink transmission can vary among component carriers. As radio waves propagate along a path length, they dissipate power. The greater the path length, therefore, the greater the uplink transmission power required. Three different scenarios are illustrated in FIGS. 3-5 that can cause transmissions on different component carriers to travel significantly different propagation distances. These scenarios are provided for purpose of illustration, but do not cover all relevant potential scenarios.

FIG. 3 provides an example illustration in which a UE 302 is configured with a PCell associated with a first component carrier signal 306 transmitted at a first frequency $f_1$. An SCell is associated with a second component carrier signal 308 transmitted at a second frequency $f_2$. The first component carrier signal can be relayed to the eNodeB 310 by a first frequency selective repeater 312. The second component carrier signal can be relayed to the eNodeB by a second frequency selective repeater 314.

Each repeater 312, 314 can be positioned a different distance from the eNodeB 310. Depending on the location of the UE 302 relative to each repeater and the distance of each repeater relative to the eNodeB, the distance traveled by the first component carrier signal 306 can be substantially different than the distance traveled by the second component carrier signal 308. If the arrival timing of the component carrier signals at the eNodeB is greater than $4T_s$, then the timing is not within the 3GPP LTE specification standard. Thus, there may be a need to perform a timing advance for each component carrier.

Additionally, as appreciated, the different path lengths result in different propagation distances for uplink transmission. The different propagation distances require different power levels for successful and reliable transmission. The greater the timing advance to compensate for greater delay, the more power will be required for uplink transmission.

Similarly, FIG. 4 provides an example in which a UE 402 transmits a first component carrier signal 406 having a first frequency $f_1$ and also transmits a second component carrier signal 408 having a second frequency $f_2$. The first component carrier can be received by a first frequency selective remote radio head (RRH) 412 for initial baseband processing and then communicated to a base band unit (BBU) or eNodeB 410 for additional processing and communication to a network. The second component carrier can be received by a second remote radio head 414 and communicated to the BBU/eNodeB.

As in FIG. 3, the position of the UE 402 relative to each RRH 412, 414, and the position of each RRH relative to the eNodeB 410 can change the path length and propagation distance of each component carrier signal 406, 408 and create a potential need for individual timing advance for each component carrier. These different timing advances will correspond to different power requirements for uplink transmission due to the different path lengths.

FIG. 5 provides an additional example, wherein a UE 502 is configured to communicate with a first eNodeB 510 and a second eNodeB 512 using Coordinated Multipoint (CoMP) communication. The first and second eNodeBs can be connected by a high speed optical fiber or other type of communication link to enable communications between the eNodeBs to be coordinated. For instance, an X2 link can be formed between the eNodeBs. In this example, the UE communicates via a first component carrier signal 506 having a first frequency $f_1$ and a second component carrier signal 508 having a second frequency $f_2$.

The first component carrier signal 506 can be received by the first eNodeB 510. Additionally, the second component carrier signal 508 can be received by the second eNodeB 512. In the context of uplink CoMP, different cells can receive the UE's 502 signals on any component carrier. The timing advancement could therefore be chosen to target any of the cells. Thus, different carriers could have different timing advance commands. As in FIGS. 3 and 4, the position of the UE relative to each eNodeB can change the path length of each component carrier and create a potential need for individual timing advance and power control for each component carrier.

In FIGS. 3-5, multiple path lengths and propagation distances correspond to different power demands for uplink power transmission. These multiple path lengths result from different combinations of resources in heterogeneous networks, from multiple eNodeBs to the use of RRHs and repeaters/relays in connection with an eNodeB. Many other combinations are possible. A heterogeneous network makes more efficient use of available frequency band and provides more uniform coverage through the use of additional resources by adding RRHs, relays, and small cells, such as micro cells, pico cells, femto cells, and home cells to an area. As increasing demands are being placed on wireless networks, the number of additional resources employed to offload and lesson the demand on legacy resources is increasing.

Figures 6A, 6B:
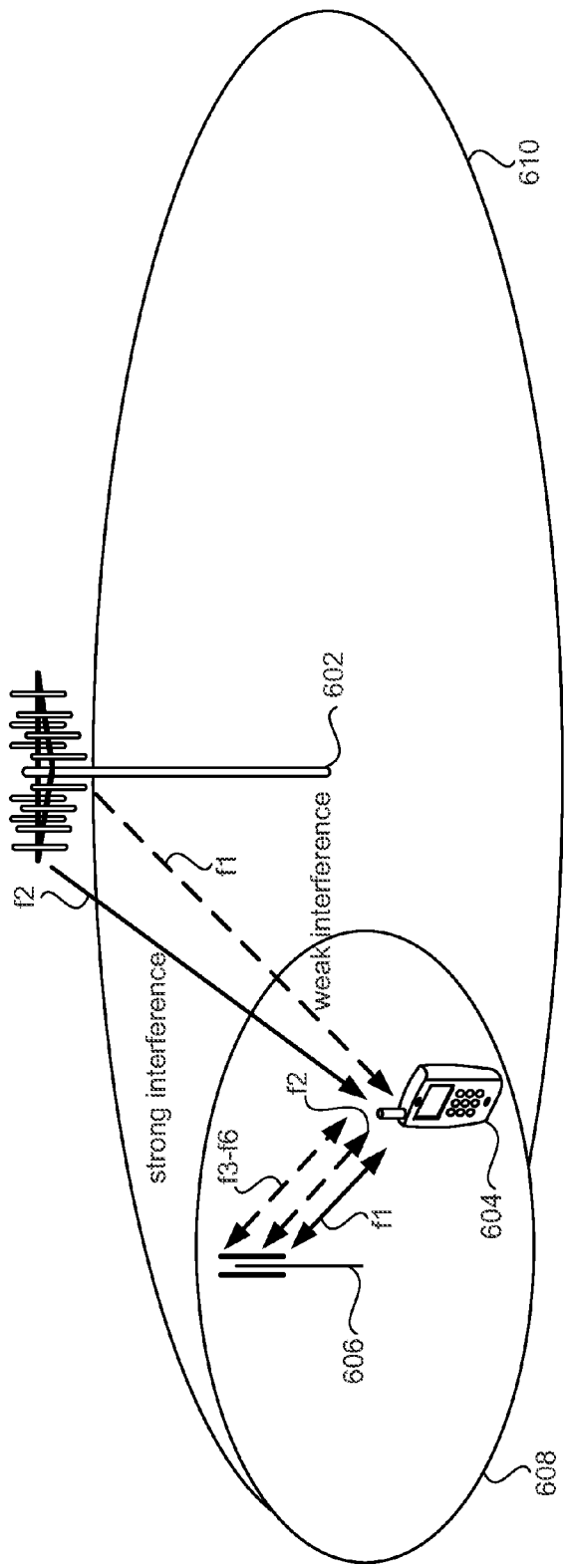
FIG. 6a is a block diagram illustrating a communication system applying carrier aggregation in a heterogeneous network for user equipment that needs to determine uplink transmission power in accordance with an example.
FIG. 6b provides a table illustrating the relationship between various evolved Node Bs, user equipment, component carriers, transmission frequencies, frequency bands, and cell types in accordance with an example.

FIG. 6a depicts a heterogeneous network environment in which carrier aggregation is employed. Such environments result in a need for multiple timing advances and transmission powers, together with an enhanced need for power control. The depiction provides only a single illustrative example, and those of ordinary skill in the relevant art will recognize an almost unlimited variety of alternative heterogeneous networks. The network includes a macro cell eNodeB 602 configured to communicate with a UE 604 within two distinct frequency bands. Communication within the first frequency band is indicated by a dashed arrow, f1, to show that the first frequency band pertains to a SCell. Communication within the second frequency band is indicated by a solid arrow, f2, to show that the second frequency band pertains to a PCell. As shown in FIG. 6b, the first frequency band (band x) corresponds to a particular component carrier, CC1, and the second frequency band (band y) corresponds to another component carrier, CC2.

The network environment illustrated in the example of FIG. 6a also includes a pico cell eNodeB 606. While a pico cell is used in this example, any type of low power node, such as a micro cell, femto cell, home eNodeB, repeater, RRH, and so forth, can also be used. Importantly, the pico cell in this example is also configured to communicate with the UE 604 for uplink and downlink transmissions over the first frequency range, f1, corresponding to CC1, and over the second frequency range, f2, corresponding to CC2. In other words, the macro cell 602 and the pico cell 606 can be configured to communicate in the same time/frequency over f1 and f2. However, the first frequency range, f1, is depicted as a solid arrow in relation to the pico cell eNodeB 606 inasmuch as it pertains to a PCell in relation to the pico cell eNodeB 606. Similarly, the second frequency range, f2, is depicted as a dashed solid arrow in relation to the pico cell eNodeB 606 inasmuch as it pertains to a SCell in relation to the pico cell eNodeB 606. Also of importance, the pico cell coverage area 608 overlaps the macro cell coverage area 610, resulting in the potential for interference within CC1 and CC2. The pico cell and UE are also configured for uplink and downlink communication within four additional frequency ranges, f3-f6, corresponding to four additional component carriers CC3, CC4, CC5, and CC6, respectively, depicted as a dashed arrow in as much as the pertain to SCells.

FIG. 6b indicates the component carriers for which the macro cell 602 and the pico cell 606 are configured and categorizes the component carriers by the frequency band to which they pertain, a cell type, i.e., PCell or SCell, and a number associated with the component carrier with respect to either the macro cell or the pico cell. As appreciated from FIG. 6b, the PCell for the macro cell is configured for CC2, with CC1 serving as the macro cell's only SCell. Conversely, CC1 is configured as a PCell for the pico cell, while CC2 and CC3 through CC6 configured as different SCells. The use of different component carriers for PCell designation can be the result of Enhanced Inter Cell Interference Coordination (EICIC). A component carrier configured for both uplink and downlink transmission can be considered a cell and can be configured as either a PCell or SCell based on its functions, as described above.

Another important piece of information provided by the table of FIG. 6b is that CC1 operates in a first frequency band, referred to as band x, whereas CC2 and CC3 through CC6 operate in a second frequency band, referred to as band y. The use of component carriers which operate in different frequency bands can have a significant impact on the amount of power that needs to be applied to each component carrier during uplink transmission, due to differences in path-loss and propagation characteristics of radio waves operating at different frequencies, as previously discussed. In this example, the uplink power for CC1 can be significantly different than the uplink power for CC2-CC6, which are in a different frequency band than CC1.

The example depicted in FIG. 6a and FIG. 6b can result in situations where the traditional approach to open loop power control is inadequate. The aggregation of carriers in different bands, the proliferation of radio resources, and the resultant interference can reduce the quality of the estimation for uplink power transmission based on an estimation of downlink path-loss, with respect to certain component carriers in which there is significant interference.

For example, in the scenario depicted in FIG. 6a and FIG. 6b there is relatively weak interference between the macro cell 602 and the pico cell 606 on CC1, relative to CC2, which has substantially strong interference in the communication between the UE 604 and the pico cell on CC2. Because the interference is weak on CC1, the open loop method of using the estimation of downlink power loss on CC1 to control power for an uplink transmission on CC1 can be used. As the propagation distance varies between the UE 604 and the macro cell 602 and the UE 604 and the pico cell 606, a different downlink path-loss estimation can be performed for each distance. Similarly, since there is no competing transmission on frequency 3 associated with CC3, estimation of downlink path-loss on CC3 to control power for an uplink transmission on CC3 can also be used.

However, this is not the case for CC2 because of the strong interference within frequency 2 caused by the macro node 602. The relatively strong interference, as compared to the interference within frequency 1, results in a high likelihood of an inaccurate downlink estimation for power loss. Therefore, existing methods of open loop power control cannot be used to determine a power for uplink transmission on CC2.

Reliance on a downlink estimation of power loss for frequency 1 in connection with CC2 is also problematic because frequency 1 and frequency 2, as associated with CC1 and CC2 respectively, are in different frequency bands, i.e., frequency band x and frequency band y. Therefore, a downlink estimation of path-loss that is accurate for CC1 is likely inaccurate for CC2, by anywhere from 14 dB to 25 dB. These inaccuracies would not result if the downlink path-loss estimation for CC3 were used for uplink transmission power control on CC2 because the frequencies associated with CC2 and CC3 are in the same frequency band. Currently, path-loss estimation for different component carriers does not take into account that the component carriers can be operating in different frequencies, thereby resulting in substantially different path-loss of the uplink signal.

To overcome these obstacles, an eNodeB can compile and send, and a UE can receive, one or more component carrier lists for component carriers in the same frequency band. The UE can receive this list from the eNodeB for purposes of reference. By reference to the component carrier list, the UE can control power for uplink transmission because component carriers within the same frequency band are likely to have substantially similar multipath and/or propagation characteristics. Therefore, a UE can estimate a path-loss on the downlink for a component carrier in the list with sufficiently low interference. The UE can then use that path-loss estimate to control uplink power on any component carrier in the list even if there would be too much interference otherwise on the downlink of that component carrier to get accurate path-loss estimation.

Even if component carriers are associated with frequencies in the same frequency band, however, a downlink path-loss estimation may not serve as an accurate basis for uplink power control. For example, although the component carriers can be in the same frequency band, they can be subject to different levels of interference present in the two component carriers on their respective uplinks. An estimation of path-loss, for example, can have been determined for one component carrier which would experience less interference on its uplink than would be encountered on a second component carrier on the second component carrier's uplink. This can result in an inaccurate estimate of path-loss for the second component carrier that does not account for the interference, even though the two component carriers are in the same frequency band. The UE can take additional measures, as discussed below, to account for this interference. However, interference is not the only other factor relevant to uplink power control at a UE.

As another example of such factors, the propagation distance between different cells can vary greatly, as illustrated in FIG. 3 through FIG. 5 and as depicted by the different distances between the UE 604 and the macro cell eNodeB 602 and the UE 604 and the pico cell 606 in FIG. 6. These different propagation distances will likely result in different power requirements. Even where a downlink path-loss estimation has been made within the same frequency band, different propagation distances to different physical resources, such as different eNodeBs, as depicted in FIGS. 3-6, can result in different power requirements for an uplink communication from a UE to an eNodeB.

Steps have been taken to address these different path lengths with respect to timing control. For example, multiple timing advances (either forwards or backwards in time) can be performed to accommodate multiple different time delays between a UE 604 and one or more eNodeBs 602, 606. Timing advances that are substantially similar or sufficiently similar can then be grouped by eNodeBs into timing advance groups (TAG). A reference eNodeB in a TAG can assign a timing advance value to a UE for the TAG. Conversely, eNodeBs that are separated by more than a selected distance, resulting in an undesired difference in the time of arrival of an uplink signal, can be placed in a different TAG to accommodate for the different path lengths. However, the implications of different path lengths have not been addressed in terms of power control. The use of heterogeneous environments with carrier aggregation to increase available bandwidth can result in increased complexity to accurately predict open loop uplink transmission power for a UE.

To overcome these obstacles, in addition to configuring the component carriers for communication between an eNodeB 602, 606 and a UE 604, an eNodeB can again compile and send, and a UE can receive, a component carrier list, along the lines of the component carrier list discussed above. In such embodiments, an eNodeB can again group multiple component carriers, whether configured as PCells, SCells, or in some other way. These component carriers can be grouped by the eNodeB based on the geographic location of the transmission node associated with each component carrier. In such embodiments, the component carriers in a component carrier list can have similar propagation distances based on the geographic location of the transmission node corresponding to the cells. As stated, the list can be limited to SCells or can include PCells. In certain embodiments, a similar list can be generated on the basis of serving cells having timing advances belonging to the same TAG, or serving cells belonging to the same TAG.

TAGs can be formed in many different ways. TAGs can be formed based on timing advances assigned to component carriers. Additionally, TAGs can be formed on the basis of component carriers that have been assigned timing advances together with information about the infrastructure of the wireless network in situations where not every component carrier has been assigned a TAG.

With respect to the first approach, one none-limiting example is found by a combination of UE initiated and eNode B initiated random access channel (RACH) procedures. UE RACH procedures are designated to be carried by the PCell in the 3GPP LTE Release 8/9/10 specifications. However, although RACH procedures are not generally defined for SCells, eNodeB initiated RACH procedures can be used by an SCell to allow for adjustments of a timing advance for the SCell.

In such situations, the need for an adjustment of a timing advance by an SCell is determined by an eNodeB. RACH procedures can be triggered by the eNodeB through a physical downlink control channel (PDCCH) order on a scheduling cell for the uplink for which a timing advance adjustment is needed. Since the RACH procedure for timing advance adjustment in SCells can be triggered by the eNode B, and the uplink RACH transmissions are expected and directed by the eNode B, the transmissions can be configured to use designated preambles to avoid possible contention. In this way, all component carriers can be assigned timing advances, whether they are associated with a PCell or an SCell.

With respect to the second approach, only a limited number of timing advances for component carriers can be determined. However, remaining component carriers can be assigned to different TAGs based on geographic locations of nodes associated with each component carrier relative to one another. Component carriers located within a selected distance of each other can be assigned to the same TAG. A separate timing advance timer can be maintained for each TAG. Furthermore, in some embodiments, future standards for SCell RACH communication can also be employed.

Component carriers can be identified as a member of a TAG by many different means. For example, a TAG can be identified by a cell index (CI) of one of the carrier components in the TAG, which is associated with other component carriers in the TAG. In one non-limiting embodiment, an implicit rule can be used, such as using the node in the serving cell in the TAG with the smallest cell index value as the reference CI. In certain embodiments, component carriers associated with a PCell can provide the CI. In alternative embodiments, a timing advance index can be associated with component carriers in a TAG and chosen to identify the TAG. Regardless of the type of information used to identify a TAG and its member component carriers, this information can then also be used to identify when the same uplink power estimate can be used for each component carrier identified as being in the same TAG.

Since component carriers that are organized into the TAG can have similar propagation distances between a UE and the wireless transmission node(s) associated with the component carriers, these component carriers can have similar power requirements, at least in terms of propagation distance. Therefore, assuming other variables that effect uplink power transmission needs are substantially equal (e.g. frequency band and interference levels), if the downlink pathloss estimation can be made for one component carrier, the power for uplink transmission power for others in the list can be substantially the same.

Similarly, if the uplink transmission power were determined for any component carrier in the same TAG by some other means, the same uplink transmission power for other component carriers in the TAG can be applied. One or more TAGs can be communicated by the eNodeB to a UE for purposes of uplink power control. TAGs can form the basis of component carrier lists, such as those discussed above, or can be provided by an eNodeB in addition to one or more component carrier lists.

Any combination of frequency bands, propagation distances, and TAGs can be the basis for grouping component carriers in a component carrier list. For example, and not by way of limitation, a component carrier list can include component carriers with substantially the same propagation distance and in the same frequency band, component carriers with only a substantially similar propagation distance irrespective of other considerations, and component carriers that are in the same frequency band, irrespective of other considerations. However, frequency bands, propagation distances, and TAGs need not be the only considerations for including component carriers in a component carrier list. Other factors pertinent to uplink transmission power estimation can also be used to vet the inclusion of component carriers in component carrier lists.

Additional measures, however, can also be taken into account for factors related to uplink power estimation, such as interference levels on different component carriers. In some embodiments, component carriers can be identified for selection in a component carrier list used for purposes of uplink power control based on interference parameters which effect power dissipation, where this information is known to the eNodeB. However, interference information need not be included in a component carrier list.

Figure 7A:
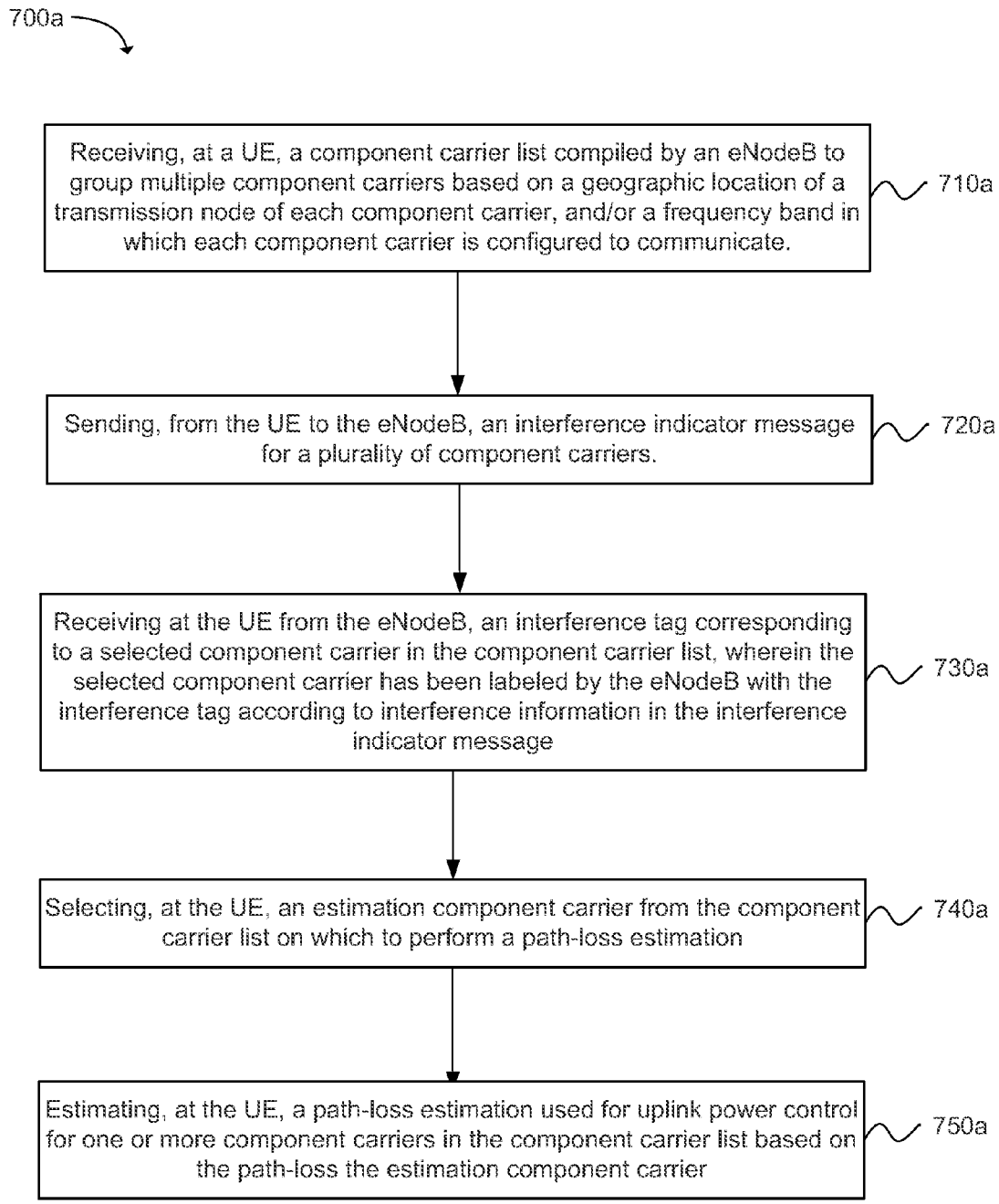
FIG. 7a is a flowchart depicting a process for using a component carrier list and other measures to control uplink transmission in accordance with an example.

FIG. 7a illustrates a process for using a component carrier list and other measures to control uplink transmission. As shown in block 710a, the UE can receive a component carrier list compiled by an eNodeB to group multiple component carriers based on a geographic location of a transmission node of each component carrier, and/or a frequency band in which each component carrier is configured to communicate. In some, but not all embodiments, the UE can also send 720a an interference indicator message for a plurality of component carriers to the eNodeB.

In some embodiments, the eNodeB can trigger the UE to generate the interference indicator message on the basis of on an event occurring at the eNodeB. One example of such an event can be the commencement of a RACH communication with the eNodeB. In additional embodiments, the UE can trigger the generation of the interference indicator message upon an event occurring at the UE, such as the reception of a new TA. The UE can generate the interference indicator message with information that can be received on the downlink for component carriers in the plurality of component carriers addressed by the interference indicator message. For example, the UE can receive reference signals in the downlink of a component carrier.

Since the reference signals can be known a priori by the UE, the UE can use one or more reference signals to make measurements about signal quality on the component carrier within the downlink in which the reference signals were received. Such measurements can include measurements to determine a signal-to-noise ratio (SNR), signal-to-interference plus noise ratio (SINR), signal-to-noise plus distortion ratio (SNDR), and/or other information relevant to signal quality. The UE can use reference signals in the downlink from multiple component carriers to make measurements for these component carriers in this fashion.

The UE can then combine this information to generate an interference indicator message for a plurality of component carriers. In some embodiments, the interference indicator message includes one or more Channel Quality Indicators (CQIs). In certain embodiments, one or more CQI measurements can include one or more Reference Signal Received Power (RSRP) measurements and one or more Reference Signal Received Quality (RSRQ) measurements. Additional embodiments can also include one or more Precoding Matrix Indicators (PMIs).

An eNodeB can receive the interference indicator message sent to it by the UE. Using this interference indicator message, the eNodeB can label one or more component carriers with an interference tag. As shown in block 730*a*, the UE can receive these interference tags from the eNodeB. Such interference tags can be assigned based according to interference information in the interference message. For example, and by way of illustration, not limitation, interference tags can be used to separate component carriers into different classes.

In some such embodiments, where an interference indicator message is sent by the UE and an interference tag is received by the UE, a type 1 component carrier class can be defined. According to the definition of the type 1 component carrier class, component carriers within the type 1 component carrier class have an interference level below a predefined threshold. Conversely, a type 2 component carrier class can also be defined. According to this second definition, component carriers within the type 2 component carrier class have an interference level that is not below the predefined threshold.

The predefined threshold may be, for example, an SINR of −5 dB. However, other values with respect to SINR and other measurements are consistent with various embodiments. An interference tag indicating membership in the type 1 component carrier class can be associated with component carriers in this class. Likewise, interference tags indicating membership in the type 2 component carrier class can be associated with component carriers in that class. In some embodiments one interference tag can be inferred by the absence of the other.

Based on one or more component carrier lists, interferences tags and/or TAGs, the UE can select 740*a* an estimate component carrier from a component carrier list. (In embodiments, where an interference indicator message is sent by the UE and an interference tag is received by the UE, interference tags cannot be a basis for selecting the estimation component carrier. In certain embodiments, blocks 720*a* and 730*a* are not implemented and the method 700*a* can proceed from block 710*a* to block 740*a*) The UE can select the estimate component carrier for purposes of performing a path-loss estimation. The UE can estimate a path-loss estimation on the estimate component carrier. This path-loss estimation can be performed based on known reference signals in the downlink of the estimation component carrier.

In some embodiments, the estimation component carrier can be selected by the UE from a component carrier list that includes a component carrier that is selected to transmit uplink information and in which a PCell for the UE is configured. In certain embodiments, the UE selects the estimation component carrier at random from the component carrier list as long as the estimation component carrier is an activated component carrier. Some component carriers can be partially setup by a UE and/or eNodeB without being fully activated. Activated component carriers are those component carriers that are planned to be used to communicate within a relatively short time period, or those that are actively being used to communicate. Component carriers are considered deactivated where neither of these conditions is met.

In certain embodiments, where multiple activated component carriers are available in a component carrier list, the UE can select the component carrier with the smallest component carrier index value. In some embodiments, where a component carrier of the type 1 component carrier class either does not exist or is not activated, the UE can select the estimation component carrier on the basis that it is associated with a PCell for which the UE is configured. As shown in block 750*a*, the UE performs a path-loss estimation with known reference signals in the downlink for the estimation component carrier. The estimated path-loss is then used for uplink power control for the estimation component carrier.

The path loss estimation for the path loss component carrier can then be used to estimate the path loss for other component carriers. Since the other component carriers in the same component carrier list as the estimation component carrier can have similar propagation distances and propagation characteristics, inasmuch as they share a common frequency band, they can also have similar path loss values. Therefore, the estimation component carrier can serve as the basis for estimating the path loss of other component carriers in the same component carrier list as the estimation component carrier.

In some embodiments, the information received by the UE from the eNodeB can include a path-loss difference parameter. The path-loss difference parameter provides an offset to be applied during uplink transmission in one cell as opposed to the path-loss used to determine uplink transmission power in another cell. The offset provided by the path-loss difference parameter can provide the difference in path-loss between uplink transmission in one frequency band as opposed to another.

Furthermore, the offset provided by the path-loss difference parameter can provide the difference in path-loss resulting from different propagation environments. The offset of the path-loss difference parameter can also be informed by both frequency band differences and propagation environment considerations. For example, the path-loss difference parameter can give an offset with respect to the difference in power required for transmission between two frequency bands in a particular propagation environment. Additionally, the offset provided by the path-loss difference parameter can provide the difference in path-loss based on any of the factors, or combination thereof, discussed above as the basis for generating a component carrier list.

By applying a path-loss difference parameter, power control for uplink transmission can be determined for cells in a list of cells even if no method for estimating a power value for uplink transmission is available for any one of those cells. As long as a value for uplink transmission power, or an estimate of downlink path-loss from which uplink transmission power can be derived, is available for any cell outside of the component carrier list and the difference between that cell and the component carriers of the component carrier list is covered by the offset of the path-loss parameter, the path-loss parameter can be applied to control power for uplink transmission on any of the cells in the list.

For example, and without limitation, the path-loss difference parameter can be applied where no uplink transmission power estimate is available for any cell in a cell list defined by a certain frequency band and TAG, but a power estimate is available in another frequency band for a cell with a substantially similar timing advance. In certain examples, the path-loss difference parameter can also be used to determine a path-loss estimation value for SCells in the component carrier list when each activated SCell has a signal quality value that is greater than a selected threshold. The path-loss difference parameter can also be applied to allow power control for uplink transmission on a component carrier that is not in any list at all, in a similar manner. One type of path-loss difference parameter can provide the path-loss difference between a PCell and a SCell for uplink transmission. One or more path-loss difference parameters can be received at the UE from the eNodeB with or without a component carrier list. The path-loss difference parameter can be generated and/or communicated by a path-loss module at the eNodeB.

Figure 7B:
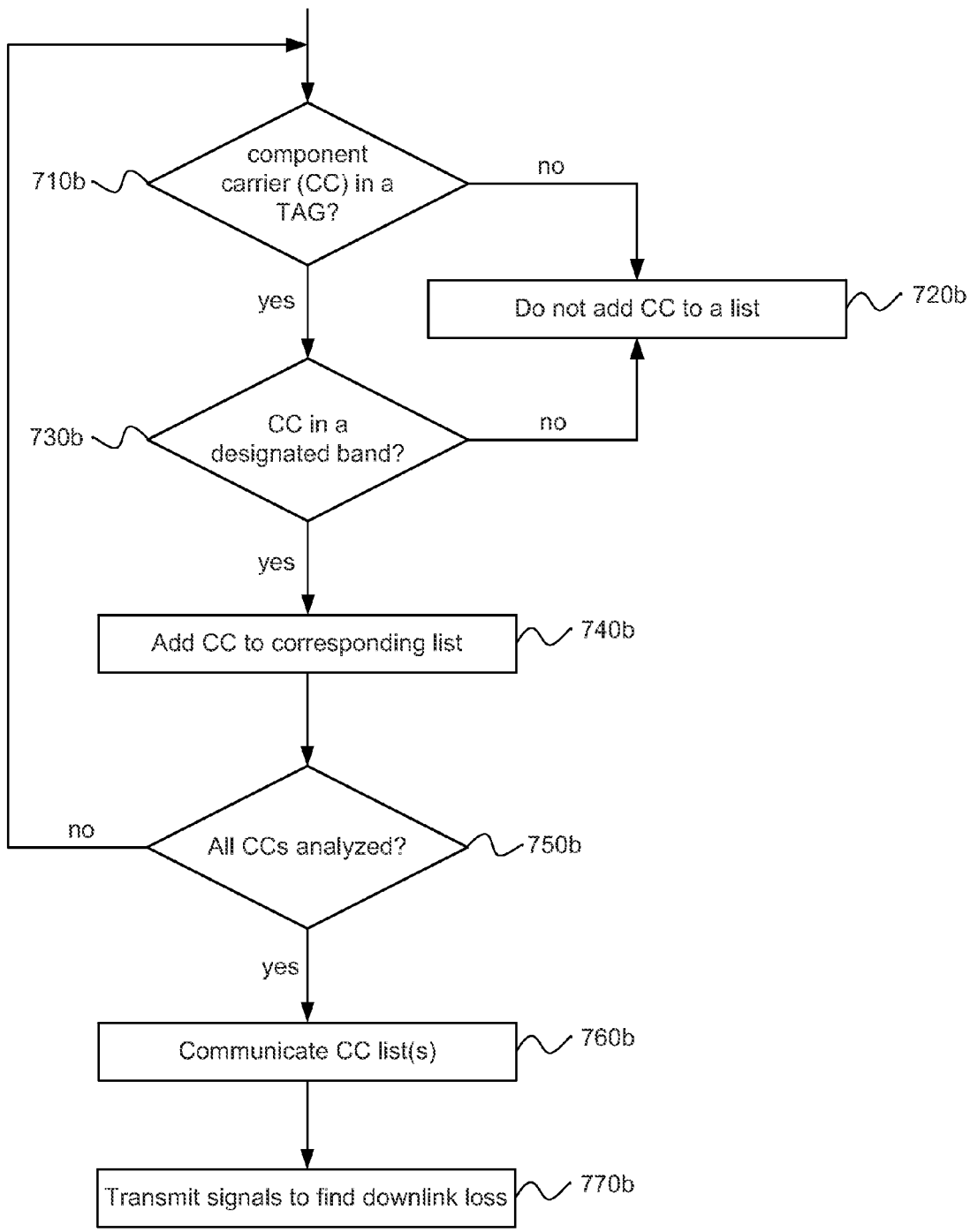
FIG. 7b is a flowchart depicting a process for generating and communicating a component carrier list for uplink power control in accordance with an example.

FIG. 7b illustrates an example of compiling, or grouping, one of many different types of component carrier lists, as it takes place at an eNodeB. For each component carrier pertaining to a given UE, the eNodeB determines 720 whether the component carrier is associated with a TAG. In the event the timing advance associated with a component carrier is not substantially similar to the timing advance associated with one of these TAGs, the component carrier is not added 730 to a component carrier list, which can be referred to as an SCell list if each component carrier in the list is an SCell. To the extent that the timing advance of the SCell is sufficiently similar, the component carrier can be added to the corresponding list.

In the embodiment depicted in FIG. 7, the eNodeB further determines 740 whether a component carrier communicates over a selected frequency band designated for a component carrier list. If it does not, it is not added 730 to a component carrier list. If it does, it is added 750 to the corresponding component carrier list. In alternative embodiments, similar determinations can be made based on information about channel interference and quality, or other considerations, before a cell is added 750 to a list. In some embodiments, only this second determination 740 regarding the frequency band of the relevant component carrier is made.

These determinations can be made in any order and in any combination, including any number of potential determinations. Once all component carriers have been analyzed 760, with respect to each relevant determination 720, 740, each resultant SCell list is communicated 770 to the UE. One or more signals can also be transmitted 780 in one or more SCells by the eNodeB on a downlink channel from the eNodeB to a UE for downlink path-loss estimation. A separate signal also can be transmitted in a PCell for downlink path-loss estimation in the PCell. Such signals can be generated and/or communicated by a transmit module at an eNodeB.

Figure 8A:
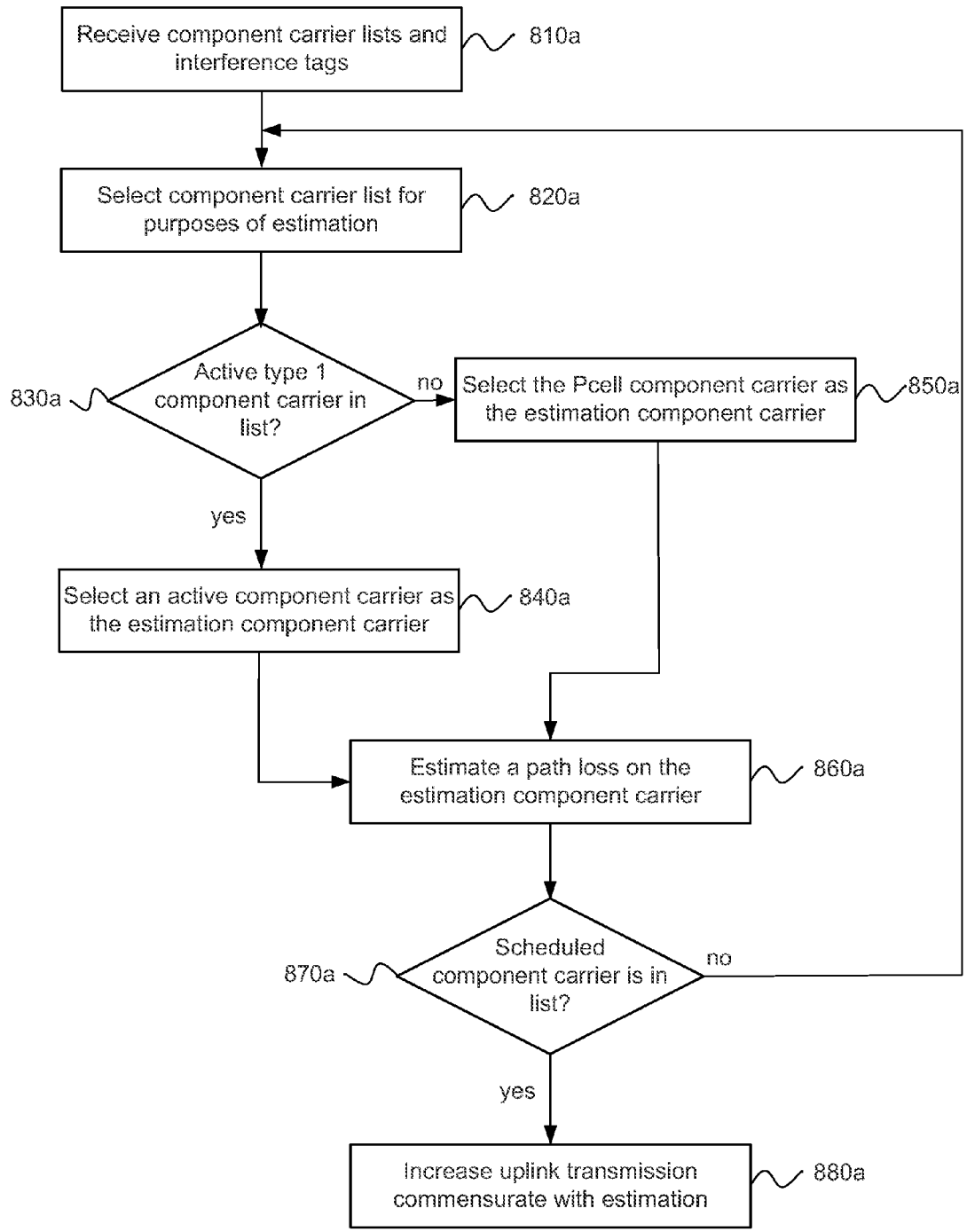
FIG. 8a is a flowchart for using a component carrier list received by the UE to control uplink power in accordance with an example.

FIG. 8a illustrates an example of using the component carrier list received by the UE from the eNodeB to control uplink power. The UE receives 810a one or more component carrier lists with one or more groups with a plurality of interference tags from the eNodeB. The UE can then select 820a one component carrier list for which to perform a path-loss estimation. The UE then determines 830a if there is at least one activated component carrier of activated the type 1 component carrier class in the component carrier list. If there is, the UE selects 840a an activated component carrier of the type 1 component carrier class as the estimation component carrier. If there is not, UE selects 850a the component carrier associated with the UE's PCell as the estimation component carrier.

The UE then estimates 860a, with one or more known reference signals in the downlink of the estimation component carrier, a path-loss. After the path-loss has been estimated, the UE determines 870a if a scheduled uplink transmission is scheduled to take place on a component carrier in the same component carrier list as the estimation component carrier list. If the determination is positive, the UE can increase 880a its power transmission by an amount commensurate with the estimated path-loss for uplink transmission. In this way, the UE is able to control uplink power for uplink transmission on component carriers in the component carrier list even when they experience too much interference on their downlink for accurate path-loss estimation. If the determination, however, is negative, the UE selects 820a another component carrier list for which to perform a path-loss evaluation.

Figure 8B:
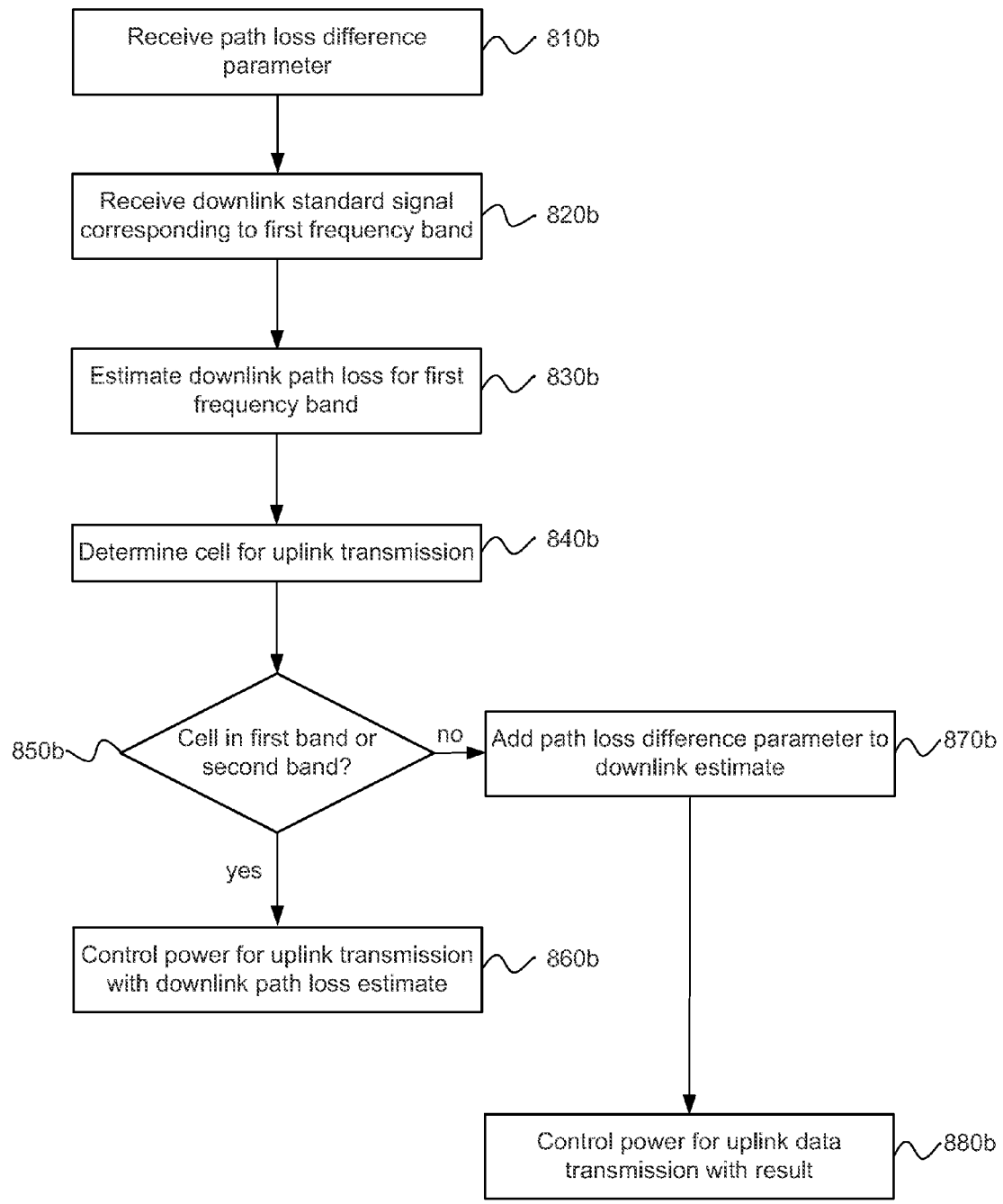
FIG. 8b is a flowchart for utilizing a path-loss difference parameter uplink power control in accordance with an example.

FIG. 8b illustrates an example of using a path-loss difference parameter to determine power for uplink transmission. A UE can receive 810b a path-loss difference parameter from an eNodeB. The UE can also receive 820b a standard signal on a downlink channel in a component carrier communicating in a first frequency band. The UE has prior knowledge of the standard signal and is, therefore, able to use the standard signal to estimate 830b a downlink path-loss for the first frequency band.

The UE then determines 840b a cell for uplink transmission. The UE also determines 850b if the cell for uplink transmission is in the first frequency band or a second frequency band. If the cell for uplink transmission is within the first frequency band, the band for which the downlink path-loss estimate was made, the UE controls 860b uplink transmission with a power sufficient to overcome the path-loss indicated by the downlink path-loss. If, however, the cell for uplink transmission is in a second frequency band, the UE adds 870b the path-loss difference parameter to the downlink estimate to determine a power for uplink transmission in the cell in the second frequency band. The UE then controls 880 the power of its uplink transmission on the basis of the value determined by combining the estimate of downlink path-loss and the path-loss difference parameter.

Figure 9:
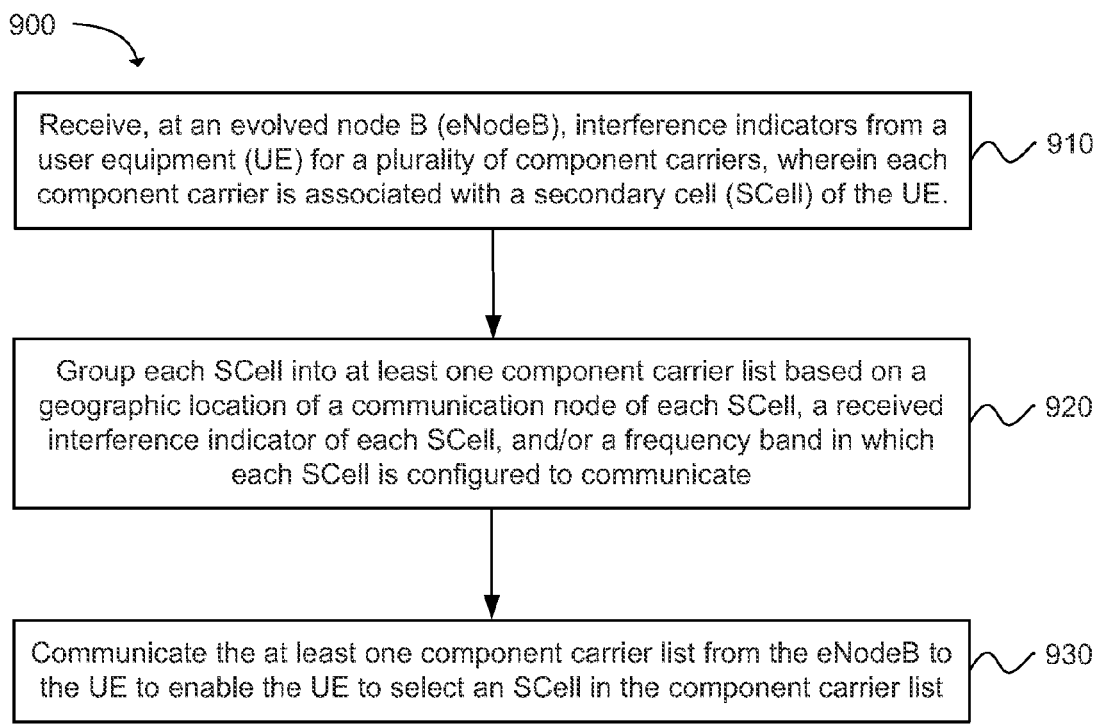
FIG. 9 is a flowchart for a generalized process for generating and communicating a component carrier list for uplink power control in accordance with an example.

FIG. 9 depicts another embodiment 900 for uplink power control. The method comprises receiving, at an evolved node B (eNodeB), interference indicators from a user equipment (UE) for a plurality of component carriers, as shown in block 910. Each component carrier is associated with a secondary cell (SCell) of the UE. The SCells are grouped into at least one component carrier list based on a geographic location of a communication node of each SCell, a received interference indicator of each SCell, and/or a frequency band in which each SCell is configured to communicate, as shown in block 920. The at least one component carrier list is communicated from the eNodeB to the UE to enable the UE to select an SCell in the component carrier list.

In one embodiment, a single path-loss estimation value for uplink power transmission is communicated to the eNodeB for a SCell in the component carrier list. In other embodiments, communication takes place from the eNodeB to the UE to establish a downlink path-loss for a selected component carrier to be used in estimating an uplink transmission power from the UE to the eNodeB. The selected component carrier can be in a different frequency band than the at least one component carrier pertaining to a SCell in the component carrier list. Some embodiments also involve communicating from the eNodeB to the UE a path-loss difference parameter comprising information of an estimated path-loss difference between a communication on two component carriers in different frequency bands. The pathloss difference parameter can also include information of an estimated path-loss difference between two frequency bands for a given propagation environment.

In certain embodiments, the transmission of a signal from the eNodeB via one of an SCell and PCell of the UE is made that is configured to allow the UE to determine a downlink path-loss to be used in conjunction with the path-loss difference parameter to estimate a power level for uplink transmission. A path-loss difference parameter, similar to the path-loss difference parameter discussed above, can be used to determine a path-loss estimation value for SCells in the component carrier list when each activated SCell has a signal quality value that is greater than a selected threshold, possibly indicating too much interference. Embodiments can also involve identifying at the eNodeB the geographic location of the transmission node of each SCell based on a TAG in which each SCell is located.

Figure 10:
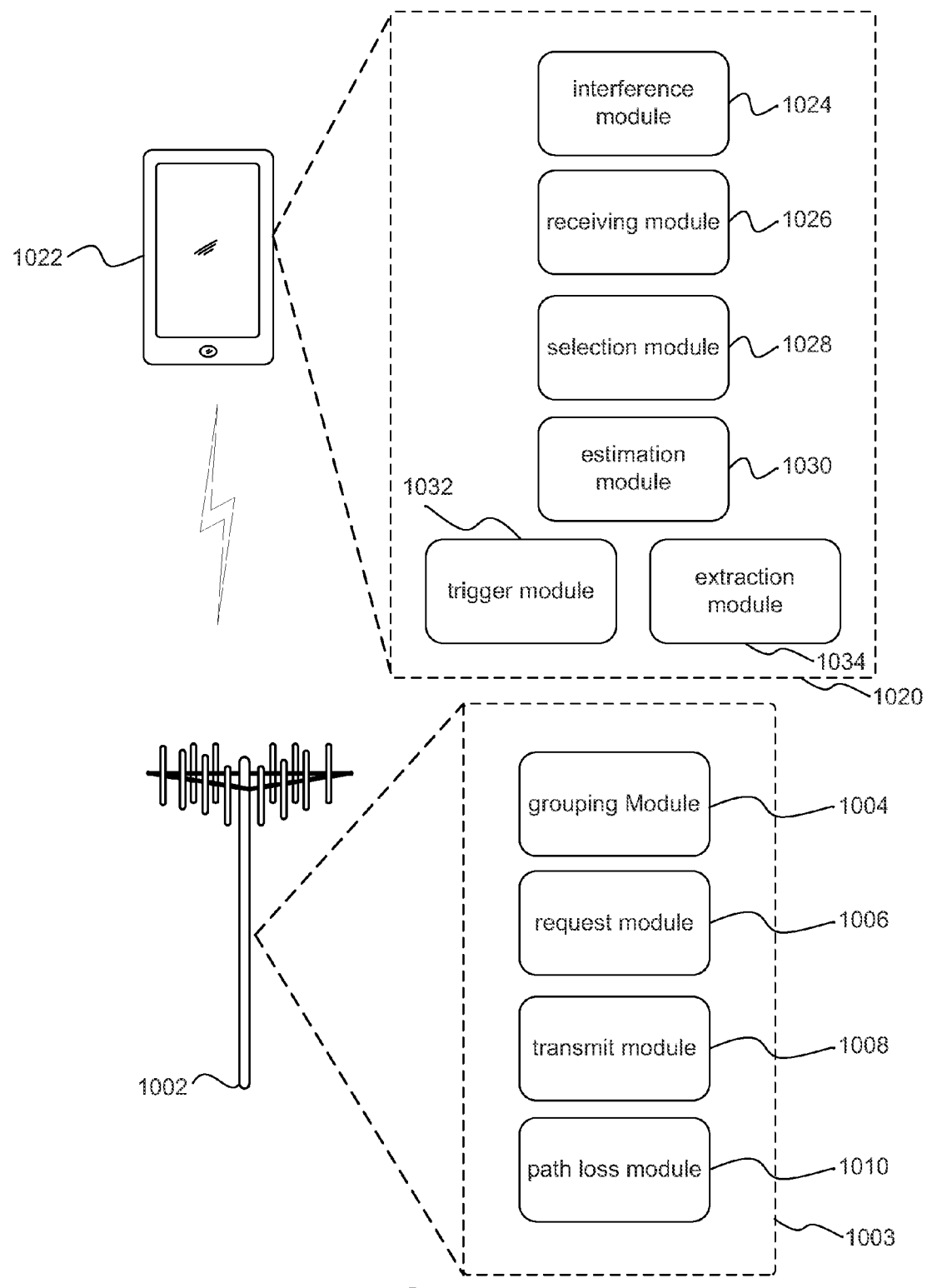
FIG. 10 is a block diagram illustrating various modules operating at and NodeB device and a UE device configured to assist in uplink power control in various examples.

In another embodiment, FIG. 10 illustrates a block diagram for uplink power control devices residing at the eNodeB and the UE. The device 1003 at the eNodeB can comprises a grouping module 1004 at an eNodeB 1002. The grouping module can categorize selected component carriers in the plurality of component carriers into at least one component carrier list based on the channel information, the TAG information, and/or the frequency band information. The grouping module can also deliver the component carrier list to the UE 1022.

Some embodiments can also include a request module 1006 operating at the eNodeB and configured to request the UE to provide interference indicators. The request module can request that the interference indicators be provided in accordance with certain reporting rules determined by the eNodeB. In such embodiments, the eNodeB can trigger the UE to provide the interference indicators to the eNodeB.

The eNodeB device 1003 can also comprise a transmit module 1008 operating at the eNodeB 1002. The transmit module can be configured to transmit a downlink signal via component carrier of the UE 1022, wherein the downlink signal is configured to allow the UE to determine a downlink path-loss for the PCell to be used to determine a power setting for uplink transmission by the UE via the PCell. In certain embodiments, the transmit module is alternatively configured to transmit a downlink signal via an SCell of the UE, wherein the signal is configured to allow the UE to determine a downlink path-loss for the SCell that can be used to estimate a power setting for uplink transmission via the SCell.

In certain embodiments, the system can comprise a path-loss module 1010 operating at the eNodeB and configured to communicate to the UE a path-loss difference parameter comprising information of an estimated path-loss difference between a communication on a PCell and an SCell. In such embodiments, the PCell can operate in a first frequency band and the SCell can operate in a second frequency band and the path-loss difference parameter accounts for a different path-loss in the first and second frequency bands. In further embodiments, the path-loss difference parameter can also include information of an estimated path-loss difference between the two frequency bands for a given propagation environment. The transmit module 1008 discussed previously can be configured, in some embodiments, to transmit a signal in a particular component carrier of the UE 1022 configured to allow the UE to determine a downlink path-loss to be used in conjunction with the path-loss difference parameter to determine a power setting for uplink transmission.

The UE device 1020 at the UE 1022 can include a receiving module 1026. The receiving module can receive one or more component carrier lists from one or more eNodeBs. The component carrier list can include a set of component carriers configured to communicate in the same frequency band and/or to transmit on a downlink channel from a similar geographic transmission location. A selection module 1028 can further be included in the UE device 1020.

The selection module 1028 can select from the component carrier list an estimation component carrier on which to perform a path-loss estimation. In some embodiments, the selection module can select the estimation component carrier from a component carrier list on the basis that it is selected to transmit uplink information on a PCell for which the UE is configured. In an alternative embodiment, the selection module selects the estimation component carrier randomly from a set of activated type 1 component carriers. In another embodiment, the selection module selects the component carrier with the smallest component carrier index value as the estimation component carrier.

An estimation module 1030 can also be included. The estimation module performs the path-loss estimation on the estimation component carrier selected by the selection module 1028. The path-loss estimation can then be used by the UE 1022 to estimate path-loss for uplink power control on the estimate component carrier and/or other component carriers in the same component carrier list. By use of a component carrier list in conjunction with an appropriate selection for the estimation component carrier, a UE can solve an important problem. The UE can obtain an accurate estimation for a second component carrier in the same component carrier list as the estimation component carrier. This is true even though the presence of interference would otherwise make an accurate estimate of path-loss on the second component carrier impossible, or very complicated.

The estimation module 1030 can perform the path-loss estimation on the estimation component carrier by using a CQI measurement in a downlink channel transmitted by the eNodeB 1002. The CQI can be transmitted from the eNodeB via either a PCell or an SCell of the UE 1022 on the estimation component carrier. Furthermore, the CQI measurement can include a unit of signal quality information, such as any of those discussed above, and/or a SINR measurement. The CQI measurement can also include one or more Reference Signal Received Power (RSRP) measurements and/or one or more Reference Signal Received Quality (RSRQ) measurements. In certain embodiments, the estimation module performs the path-loss estimation on the estimation component carrier by averaging multiple RSRP measurements on a downlink channel of the estimation component carrier. In such embodiments, the estimation component carrier can be an activated type 1 component carrier.

The estimation module 1030, in certain embodiments, can perform the path-loss estimation on the estimation component carrier by adding an average value for multiple downlink RSRP measurements on the estimation component carrier that is also associated with the UE's 1022 PCell. In such embodiments, the path-loss estimation also relies on a path-loss difference parameter received from the eNodeB 1022, with properties discussed bellow with respect to the extraction module 1034.

Furthermore, the estimation module 1030 can be used to determine additional path loss estimates. The estimation module can do this with reference to the estimation component carrier. The estimation module can determine a path-loss estimation used for uplink power control for other component carriers in the component carrier list based on the path-loss estimation of the estimation component carrier.

In certain embodiments, an interference module 1024 can also be included. The interference module can be configured to generate an interference indicator message for a plurality of component carriers. The interference module can also be configured to send the interference indicator message to the evolved Node B 1002. In such embodiments, the receiving module 1028 can also receive an interference tag for a selected component carrier in the component carrier list. The selected component carrier can be labeled by the eNodeB with the interference tag according to the interference indicator message.

In certain embodiments, the interference tag can indicate that a given/selected component carrier belongs to either a type 1 component carrier class or a type 2 component carrier class. The type 1 component carrier class can be defined to include component carriers with corresponding interference levels below a predefined threshold. Conversely, the type 2 component carrier class can be defined to include component carriers with corresponding interference levels that are not below the predefined threshold.

In some embodiments, the UE device 1020 can include a trigger module 1032. The trigger module can trigger the interference module 1024 to generate and send the interference indicator message upon receiving a message from the eNodeB. The trigger module can also, or in the alternative, trigger the generation of an interference indicator message in response to an event occurring at the UE, such as the commencement of a RACH communication with a new eNodeB.

The UE device 1020 can also include an extraction module 1034. The extraction module can extract a path-loss difference parameter received from the eNodeB by the receiving module 1026. The path-loss difference parameter can provide, and/or be used to calculate, a difference in a path-loss between two component carriers for at least one of a first scenario and a second scenario. According to the first scenario, a first component carrier of the two component carriers operates in a first frequency band and a second component carrier of the two component carriers operates in a second frequency band. According to the second scenario, the difference accounts for a given propagation environment. In yet another embodiment, a method 1100 for uplink power control is disclosed, as depicted in the flow chart in FIG. 11.

Figure 11:
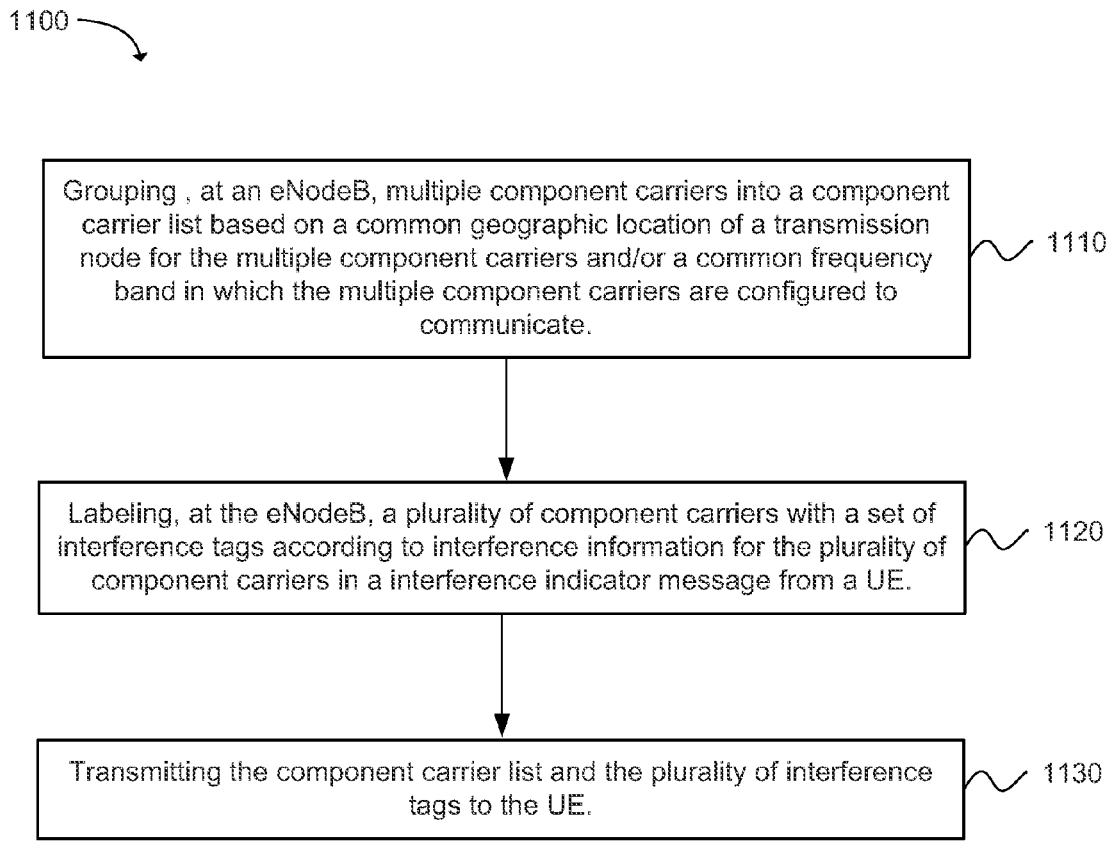
FIG. 11 is a flowchart for a generalized process for generating and communicating a component carrier list for uplink power control in accordance with an example.

FIG. 11 provides an example of a method 1100 used for power control implemented at an eNodeB. The method 1100 also involves, as shown in block 1110, grouping, at an evolved node B (eNodeB), multiple component carriers into a component carrier list based on a common geographic location of a transmission node for the multiple component carriers and/or a common frequency band in which the multiple component carriers are configured to communicate. As shown in block 1120, the eNodeB can label a plurality of component carriers with a set of interference tags to create a plurality of interference tags. The eNodeB can generate the interference tags from interference information for the plurality of component carriers in a interference indicator message received from the UE. As shown in block 1130, the eNodeB then transmits the component carrier list and the plurality of interference tags to the UE.

In some embodiments, labeling further comprises indicating whether an individual component carrier in the plurality of component carriers belongs to one of a type 1 component carrier class and a type 2 component carrier class, as defined above. Some embodiments of the method 1100 can further comprise transmitting from the eNodeB to the UE an estimated path-loss offset parameter. The path-loss offset parameter provides a path-loss difference between respective communications on two component carriers. In such embodiments, the path-loss difference can arise because of a difference in frequency bands for the respective communications of the two component carriers. In some embodiments, the path-loss difference can arise because of a given propagation environment.

Figure 12:
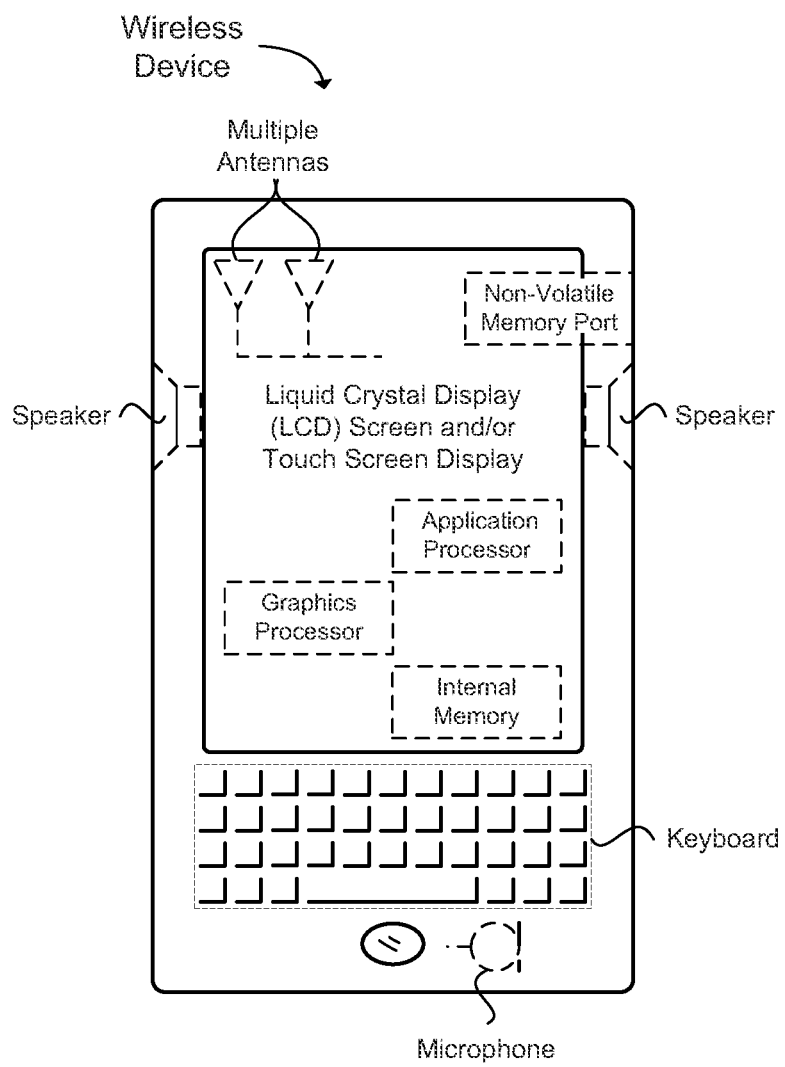
FIG. 12 illustrates a block diagram of a UE in accordance with an example.

FIG. 12 provides an example illustration of a mobile device, such as a user equipment (UE), a mobile station (MS), a mobile wireless device, a mobile communication device, a tablet, a handset, or other type of mobile wireless device. The mobile device can include one or more antennas configured to communicate with a base station (BS), an eNodeB, or other type of wireless wide area network (WWAN) access point. While two antennas are shown, the mobile device can have between one and four or more antennas. The mobile device can be configured to communicate using at least one wireless communication standard including Third Generation Partnership Project Long Term Evolution (3GPP LTE), Worldwide interoperability for Microwave Access (WiMAX), High Speed Packet Access (HSPA), Bluetooth, WiFi, or other wireless standards. The mobile device can communicate using separate antennas for each wireless communication standard or shared antennas for multiple wireless communication standards. The mobile device can communicate in a wireless local area network (WLAN), a wireless personal area network (WPAN), and/or a wireless wide area network (WWAN).

FIG. 12 also provides an illustration of a microphone and one or more speakers that can be used for audio input and output from the mobile device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the mobile device. A keyboard can be integrated with the mobile device or wirelessly connected to the mobile device to provide additional user input. A virtual keyboard can also be provided using the touch screen.

It should be understood that many of the functional units described in this specification have been labeled as modules, in order to more particularly emphasize their implementation independence. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Various techniques, or certain aspects or portions thereof, can take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device can include a processor, a storage medium readable by the processor (including volatile and non-volatile memory and/or storage elements), at least one input device, and at least one output device. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for uplink power control, comprising:
   receiving, at a User Equipment (UE), a component carrier list, the component carrier list compiled at an evolved Node B (eNodeB) to group multiple component carriers based on a geographic location of a transmission node of each component carrier (CC) and a frequency band in which each CC is configured to communicate;
   selecting, at the UE, an estimation CC from the component carrier list on which to perform a path-loss estimation; and
   estimating, at the UE, a path-loss estimation used for uplink power control for at least one CC in the CC list based on the path-loss estimation of the estimation CC, wherein the path-loss estimation on the estimation CC is performed by adding a base level value obtained by the UE through averaging multiple downlink Reference Signal Received Power (RSRP) measurements on a Primary Serving Cell (PCell) for which the UE is configured together with an estimated path-loss offset parameter value where a CC associated with the PCell is selected as the estimation CC, wherein the estimated path-loss offset parameter is configured to compensate for a path-loss difference between respective communications on two CCs, wherein the path-loss difference arises because at least one of a difference in frequency bands for the respective communications and a given propagation environment.

2. The method of claim 1, further comprising
   sending, from the UE to the eNodeB, an interference indicator message for a plurality of component carriers;
   receiving, at the UE from the eNodeB, an interference tag corresponding to a selected CC in the component carrier list, wherein the selected CC has been labeled by the eNodeB with the interference tag according to interference information in the interference indicator message; and wherein
   selecting, at the UE, an estimation CC further comprises selecting the estimation CC based on the interference tag.

3. The method of claim 2, wherein the interference indicator message for the plurality of component carriers, as transmitted by the UE, is triggered by one of the eNodeB and an event occurring at the UE.

4. The method of claim 2, wherein the interference indicator message comprises a Channel Qualify Indicator (CQI) measurement, the CQI measurement further comprising at least one of a unit of signal quality information and a signal-to-interference-plus-noise (SINR) ratio.

5. The method of claim 4, wherein the CQI measurement comprises at least one of at least one RSRP measurement and at least one Reference Signal Received Quality (RSRQ) measurement.

6. The method of claim 2, wherein the selected CC in the component carrier list received by the UE is labeled by the eNodeB with the interference tag indicating that the selected CC belongs to a type 1 CC class where the interference information corresponding to the selected CC indicates an interference level below a predefined threshold, the type 1 CC class defined to include CCs with corresponding interference levels below the predefined threshold, and otherwise the interference tag indicating that the selected CC belongs to a type 2 CC class where the interference level is not below the predefined threshold, the type 2 CC class defined to include CCs with corresponding interference levels not below the predefined threshold.

7. The method of claim 6, wherein selecting, by the UE, the estimation CC from the component carrier list on which to perform the path-loss estimation further comprises at least one of:
  selecting the estimation CC from a CC list that includes a CC that is selected to transmit uplink information and in which a PCell for the UE is configured;
  selecting at random the estimation CC from a set of activated type 1 CCs where at least one CC of the type 1 CC class is activated;
  selecting the estimation CC as having a smallest CC index value where the set of activated type 1 CCs contains multiple CCs; and
  selecting the estimation CC as a CC associated with a PCell for which the UE is configured where a CC of the type 1 CC class that is also activated does not exist.

8. The method of claim 7, wherein the path-loss estimation on the estimation CC is performed by averaging multiple RSRP measurements on a downlink for the estimation CC, wherein the estimation CC is an activated type 1 CC.

9. The method of claim 1, further comprising receiving, at the UE from the eNodeB, the estimated path-loss offset parameter configured to compensate for the path-loss difference between the respective communications on the two CCs.

10. The method of claim 9, wherein the two CCs are associated with the Pcell and a Secondary Serving Cell (SCell) respectively.

11. An uplink power control device, comprising:
  a receiving module operating at the UE, the receiving module configured to receive a CC list, from an evolved Node B (eNodeB), the CC list comprising a set of CCs configured both to communicate in a same frequency band and to transmit on a downlink channel from a similar geographic transmission location;
  a selection module operating at the UE, the selection module in communication with the receiving module and configured to select, from the CC list, an estimation CC on which to perform a path-loss estimation; and
  an estimation module in communication with the selection module and configured to:
    perform the path-loss estimation on the estimation CC, as selected by the selection module,
    determine a path-loss estimation used for uplink power control for at least one CC in the CC list based on the path-loss estimation of the estimation CC; and
    perform the path-loss estimation on the estimation CC by adding an average value for multiple downlink Reference Signal Received Power (RSRP) measurements on the estimation CC, which estimation CC is also associated with a Primary Serving Cell (PCell) for which the UE is configured, together with a path-loss difference parameter received from the eNodeB, wherein the path-loss difference parameter is configured to provide a difference in a path-loss between two CCs for at least one of a first scenario and a second scenario, wherein, according to the first scenario, a first CC of the two CCs operates in a first frequency band and a second CC of the two CCs operates in a second frequency band, and, according to the second scenario, the difference accounts for a given propagation environment.

12. The device of claim 11, further comprising an interference module operating at a User Equipment (UE), the interference module configured to:
  generate an interference indicator message for a plurality of component carriers (CCs);
  send the interference indicator message to an evolved Node B (eNodeB); and wherein
  the receiving module is further configured to receive an interference tag for a selected CC in the component carrier list, the selected CC labeled by the eNodeB with the interference tag according to the interference indicator message; and
  the selection module is further configured to select, from the CC list, an estimation CC based on the interference tag.

13. The device of claim 12, further comprising a trigger module operating at the UE, the trigger module configured to trigger the interference module to generate and send the interference indicator message upon at least one of receiving a message from the eNodeB and an event occurring at the UE.

14. The device of claim 12, wherein the interference indicator message comprises a Channel Quality Indicator (CQI), the CQI measurement further comprising at least one of a unit of signal quality information and a signal-to-interference-plus-noise (SINR) ratio.

15. The device of claim 12, wherein the CQI measurement comprises at least one of at least one RSRP measurement and at least one Reference Signal Received Quality (RSRQ) measurement.

16. The device of claim 12, wherein:
  the interference tag indicates that the selected CC belongs to one of a type 1 CC class and a type 2 CC class, the type 1 CC class defined to include CCs with corresponding interference levels below a predefined threshold, the type 2 CC class defined to include CCs with corresponding interference levels not below the predefined threshold; and
  the selection module is further configured to select the estimation CC from a CC list wherein the estimation CC is one of:
    a CC that is selected to transmit uplink information and in which a PCell for the UE is configured,
    a CC randomly selected from a set of activated type 1 CCs where at least one CC of the type 1 CC class is activated,
    a CC with a smallest CC index value where the set of activated type 1 CCs contains multiple CCs, and
    a CC associated with the PCell for which the UE is configured where a CC of the type 1 CC class that is also activated does not exist.

17. The device of claim 11, further comprising an extraction module, the extraction module configured to extract a path-loss difference parameter from the eNodeB by the receiving module, the path-loss difference parameter configured to provide a difference in a path-loss between two CCs for at least one of a first scenario and a second scenario, wherein, according to the first scenario, a first CC of the two CCs operates in a first frequency band and a second CC of the two CCs operates in a second frequency band, and, according to the second scenario, the difference accounts for a given propagation environment.

18. The device of claim 11, wherein the estimation module, at the UE, is configured to perform the path-loss estimation on the estimation CC by averaging multiple RSRP measurements on a downlink channel of the estimation CC, wherein the estimation CC is an activated type 1 CC.

19. A computer program product, comprising a non-transitory computer usable medium having a computer readable program code embodied therein, the computer readable program code adapted to be executed to implement a method for uplink power control at a User Equipment (UE), comprising:
   receiving, at the UE, a CC list from an eNodeB, the CC list comprising a set of CCs configured both to communicate in a same frequency band and to transmit on a downlink channel from a similar geographic transmission location;
   selecting, at the UE, an estimation CC from the component carrier list on which to perform a path-loss estimation;
   performing a path-loss estimation on an estimation CC selected from the CC list;
   estimating, at the UE, a path-loss estimation used for uplink power control for at least one CC in the CC list based on the path-loss estimation of the estimation CC;
   wherein performing the path-loss estimation on the estimation CC includes adding an average value for multiple downlink Reference Signal Received Power (RSRP) measurements on the estimation CC, which estimation CC is also associated with a Primary Serving Cell (PCell) for which the UE is configured, together with a path-loss difference parameter received from the eNodeB, wherein the path-loss difference parameter provides a difference in a path-loss between two CCs for at least one of a first scenario and a second scenario, wherein, according to the first scenario, a first CC of the two CCs operates in a first frequency band and a second CC of the two CCs operates in a second frequency band, and, according to the second scenario, the difference accounts for a given propagation environment.

20. The computer program product of claim 19, further comprising:
   sending, from the UE to an evolved Node B (eNodeB), an interference indicator message generated for a plurality of component carriers (CCs) associated with the UE; and
   identifying, at the UE, an interference tag received from the eNodeB for a selected CC in the component carrier list, the selected CC labeled by the eNodeB based on information pertaining to the selected CC in the interference indicator message; and wherein
   selecting the estimation CC further comprises selecting the estimation CC based on the interference tag.

21. The computer program product of claim 20, further comprising analyzing the interference tag to determine that the selected CC belongs to one of a type 1 CC class and a type 2 CC class, the type 1 CC class defined to include CCs with corresponding interference levels below a predefined threshold, the type 2 CC class defined include CCs with corresponding interference levels not below the predefined threshold.

22. The computer program product of claim 21, further comprising selecting the estimation CC from the CC list wherein the estimation CC is one of:
   a CC that is selected to transmit uplink information and in which a PCell for the UE is configured,
   a CC randomly selected from a set of activated type 1 CCs where at least one CC of the type 1 CC class is activated,
   a CC with a smallest CC index value where the set of activated type 1 CCs contains multiple CCs, and
   a CC associated with the PCell for which the UE is configured where a CC of the type 1 CC class that is also activated does not exist.

23. The computer program product of claim 19, wherein performing a path-loss estimation on the estimation CC further comprises analyzing a Channel Quality Indicator (CQI) corresponding to the estimation CC, the CQI measurement further comprising at least one of a unit of signal quality information and a signal-to-interference-plus-noise (SINR) ratio, at least one RSRP measurement, and at least one Reference Signal Received Quality (RSRQ) measurement.

24. The computer program product of claim 19, further comprising calculating the path-loss estimation in accordance with the path-loss difference parameter received from the eNodeB.

25. The computer program product of claim 19, wherein performing a path-loss estimation on the estimation CC further comprises at least one of a first approach and a second approach:
   the first approach further comprising averaging multiple RSRP measurements on a downlink channel for the estimation CC, wherein the estimation CC is an activated type 1 CC, and
   the second approach further comprising adding an average of multiple downlink RSRP measurements on a PCell for which the UE is configured together with an estimated path-loss difference parameter where a CC associated with the PCell is selected as the estimation CC, wherein the estimated path-loss difference parameter is configured to compensate for a path-loss difference between the estimation CC and a second CC for at least one of a first scenario and a second scenario, wherein, according to the first scenario, the estimation CC and the second CC operate in different frequency bands, and, according to the second scenario, the offset accounts for a given propagation environment.

* * * * *